(12) United States Patent
Minerbo et al.

(10) Patent No.: US 6,304,086 B1
(45) Date of Patent: Oct. 16, 2001

(54) METHOD AND APPARATUS FOR EVALUATING THE RESISTIVITY OF FORMATIONS WITH HIGH DIP ANGLES OR HIGH-CONTRAST THIN LAYERS

(75) Inventors: Gerald N. Minerbo, Missouri City; Richard A. Rosthal, Houston, both of TX (US)

(73) Assignee: Schlumberger Technology Corporation, Houston, TX (US)

( * ) Notice: Subject to any disclaimer, the term of this patent is extended or adjusted under 35 U.S.C. 154(b) by 0 days.

(21) Appl. No.: 09/391,310

(22) Filed: Sep. 7, 1999

(51) Int. Cl.[7] ............... G01V 3/18; G01V 3/30; G01V 3/38
(52) U.S. Cl. ............... 324/338; 324/343; 702/7
(58) Field of Search ............... 324/338–343; 702/7, 11

(56) References Cited

U.S. PATENT DOCUMENTS

| 3,551,797 | 12/1970 | Gouilloud et al. |
| 4,319,191 | 3/1982 | Meador et al. |
| 4,968,940 | 11/1990 | Clark et al. |

(List continued on next page.)

FOREIGN PATENT DOCUMENTS

| 0 490 716 A2 | 6/1992 | (EP). |
| 0 930 519 A2 | 7/1999 | (EP). |
| WO 98/00733 | 1/1998 | (WO). |

OTHER PUBLICATIONS

Mechetin, V.F., V.A. Korolev, et al. "TEMP—a New Dual–Electromagnetic and Laterolog Apparatus–Technological Complex", 13th European Formation Evaluation Symposium Transactions, Budapest Chapter, SPWLA, Paper K, 1990.

Moran, J.H. and K.S. Kunz, "Basic Theory of Induction Logging and Application to Study of Two–Coil Sondes", *Geophysics*, vol. XXVII, No. 6, Part 1 (Dec. 1962), pp. 829–858.

Anderson, Barbara et al., "Effect of Dipping Beds on the Response of Induction Tools", *SPE Formation Evaluation* (Mar. 1988), pp. 29–36.

Clark, B. et al., "Electromagnetic Propagation Logging While Drilling: Theory and Experiment", SPE Paper 18117, presented at the 63rd Annual Technical Conference and Exhibition, Oct. 2–5, 1988.

Anderson, Barbara et al., "Response of 2–MHZ L WD Resistivity and Wireline Induction Tools in Dipping Beds and Laminated Formations", SPWLA 31st Annual Logging Symposium. Jun. 24–27, 1990, Paper A.

(List continued on next page.)

*Primary Examiner*—Gerard R. Strecker
(74) *Attorney, Agent, or Firm*—John J. Ryberg; Victor H. Segura

(57) ABSTRACT

A method and apparatus for evaluating the resistivity of earth formations surrounding a borehole, particularly high-contrast thin-layer formations or at high dip angles. The method involves positioning a pair of transmitters and a pair of receivers within the borehole, the receivers or transmitters adhering to specific spacing limitations, alternately transmitting electromagnetic energy of a particular frequency and receiving voltage data associated with the transmitted energy. Multiple voltage data are acquired and a representation of a resistivity or conductivity profile is created from a formulated difference of the data from a particular depth and/or neighboring depths. The apparatus forms part of a well logging system including a well tool adapted to be moveable through a borehole. The apparatus being coupled to the well tool and adapted with means to input voltage data developed by the receivers disposed on the well tool. The apparatus further adapted with means for performing calculations to determine a conductivity profile and for recording the profile on an output record medium.

48 Claims, 26 Drawing Sheets

U.S. PATENT DOCUMENTS

| | | |
|---|---|---|
| 5,115,079 | 5/1992 | Gianzero et al. . |
| 5,184,079 | 2/1993 | Barber . |
| 5,428,293 | 6/1995 | Sinclair et al. . |
| 5,469,062 | 11/1995 | Meyer, Jr. . |
| 5,508,616 | 4/1996 | Sato et al. . |
| 5,594,343 | 1/1997 | Clark et al. . |
| 5,757,191 | 5/1998 | Gianzero . |
| 5,781,436 | 7/1998 | Forgang et al. . |
| 5,869,968 | 2/1999 | Brooks et al. . |
| 5,999,883 | 12/1999 | Gupta et al. . |
| 6,163,155 * | 12/2000 | Bittar ................................... 324/338 |
| 6,184,685 * | 2/2001 | Paulk et al. ........................... 324/338 |

OTHER PUBLICATIONS

Meyer, W. Hal, et al., "A New Slimhole Multiple Propagation Resistivity Tool", SPWLA 35$^{th}$ Annual Logging Symposium, Jun. 19–22, 1994, Paper N.

Barber, Thomas D. et al., "Interpretation of Multiarray Induction Logs in Invaded Formations at High Relative Dip Angles", *The Log Analyst*, vol. 40, No. 3 (May–Jun. 1999), pp. 202–217.

* cited by examiner

METHOD AND APPARATUS FOR EVALUATING THE RESISTIVITY OF FORMATIONS WITH HIGH DIP ANGLES OR HIGH-CONTRAST THIN LAYERS

1. BACKGROUND OF THE INVENTION

1.1 Field of the Invention

This invention relates to the field of well logging and, more particularly, to a well logging method and apparatus for evaluating formation properties, such as resistivity, in high-contrast thin-layer formations or at high dip angles, with greater accuracy than prior techniques. Still more particularly, this invention relates to an improved technique for acquiring multiple data during resistivity logging, processing these data, and creating a representation of resistivity or conductivity from a formulated difference of data from a particular depth and/or neighboring depths.

1.2 Description of Related Art

Resistivity logging is a well-known form of electromagnetic ("EM") propagation logging. [In the present application, any references to resistivity are intended to encompass its inverse, conductivity, and vice-versa.] Resistivity logging is used for locating and evaluating the properties of potential hydrocarbon bearing zones in subsurface formations. Porous formations having high resistivity generally indicate the presence of hydrocarbons, while low resistivity formations are generally water saturated.

Resistivity logging is realized in different ways. A well tool, comprising a number of transmitting and detecting devices for measuring various parameters, can be lowered into a borehole on the end of a cable, or wireline. The cable, which is attached to some sort of mobile processing center at the surface, is the means by which parameter data is sent up to the surface. With this type of wireline logging, it becomes possible to measure borehole and formation parameters as a function of depth, i.e., while the tool is being pulled uphole.

An alternative to wireline logging techniques is the collection of data on downhole conditions during the drilling process. By collecting and processing such information during the drilling process, the driller can modify or correct key steps of the operation to optimize performance. Schemes for collecting data of downhole conditions and movement of the drilling assembly during the drilling operation are known as measurement-while-drilling ("MWD") techniques. Similar techniques focusing more on measurement of formation parameters than on movement of the drilling assembly are know as logging-while-drilling ("LWD"). However, the terms MWD and LWD are often used interchangeably, and the use of either term in the present disclosure should be understood to include both the collection of formation and borehole information, as well as data on movement of the drilling assembly.

U.S. Pat. No. 3,551,797 describes a conventional EM propagation logging technique. The '797 patent describes the transmission of EM energy into the formations, where energy shed back into the borehole is measured by receivers to determine the relative attenuation and/or the phase shift of the EM energy propagating in the formation. See also B. Clark et al., *Electromagnetic Propagation Logging While Drilling: Theory and Experiment*, SPE SIXTY-THIRD ANNUAL TECHNICAL CONFERENCE AND EXHIBITION, paper 18117, 1988.

U.S. Pat. Nos. 4,968,940 and 5,594,343 (both assigned to the assignee of the present invention) disclose conventional well logging tools used to evaluate the resistivity of formations in LWD operations. The '940 patent concerns the determination of formation resistivity at different radial depths of investigation with the use of multiple receivers. The '343 patent concerns the determination of formation properties at different radial depths of investigation with the use of multiple transmitters.

Conventional propagation and induction techniques for evaluating the resistivity of formations have practical limitations. Neighboring layers in high-contrast (in terms of resistivity) thin-layer formations can corrupt the measurement results—known as shoulder effect. At high dip angles, horns and other artifacts are seen in the measured data. Modeling and actual measurements have confirmed these effects. See B. Anderson et al., *Response of 2-MHz LWD Resistivity and Wireline Induction Tools in Dipping Beds and Laminated Formations*, SPWLA THIRTY-FIRST ANNUAL LOGGING SYMPOSIUM, pp. 1–25, 1990. The cause of the horns is transverse magnetic ("TM") coupling which becomes important at high dip angles. The TM horns observed are useful to detect layer boundaries, but are detrimental for quantitative formation evaluation.

U.S. Pat. No. 5,184,079 describes a method for correcting data developed from a well tool, disposed at a dip angle in a well bore, to eliminate the effects of the dip angle on the measured data. Another method for correcting induction logs, at high apparent dip angles, was described by Barber et al., *Interpretation of Multiarray Induction Logs in Invaded Formations at High Relative Dip Angles*, SPWLA THIRTY-NINTH ANNUAL LOGGING SYMPOSIUM, June 1998. This method requires time-consuming model calculations, and cannot be applied at the well site while logging. An underlying criterion of the methods described by the '079 patent and Barber et al. is the requirement that the dip angle be known before the methods can be applied.

U.S. Pat. No. 5,508,616 describes an induction tool incorporating transmitter and receiver coils disposed in an inclined fashion along the tool axis. PCT Application WO 98/00733, Bear et al., describes a logging tool including triaxial transmitter and receiver coils. U.S. Pat. No. 4,319,191 describes a logging tool incorporating transversely aligned transmitter and receiver coils. The techniques proposed by these disclosures do not address the evaluation of high-contrast thin-layer formations at high dip angles. U.S. Pat. No. 5,115,198 describes a method and apparatus for measuring the dip and strike of formations utilizing a tool with a triaxial receiver coil. U.S. Pat. No. 5,757,191 describes a method and system for detecting formation properties with a tool including triaxial transmitter and receiver coils. However, the proposed techniques require that the dip and/or strike angle be ascertained in order to practice the methods.

It is desirable to obtain a simplified method and apparatus for accurately evaluating the resistivity of formations with neighboring layers of high-contrast thin-layer formations or at high dip angles. Still further, it is desired to implement a logging technique that is not limited to piecewise constant model formations or prior knowledge of dip angles. Thus, there remains a need for a simplified logging process and apparatus to produce accurate resistivity profiles in these situations.

2. SUMMARY OF THE INVENTION

A method and system are provided for evaluating the resistivity of earth formations surrounding a borehole.

In a first aspect of the invention, a pair of transmitter coils and a pair of receiver coils are configured within the borehole, the receivers being separated by a particular spacing. EM energy is alternately transmitted at a particular frequency. The energy is alternately received and measured at the receivers and voltage data corresponding to the measured phase and amplitude are developed and stored. The voltage data are then processed to determine the formation conductivity, giving conductivity estimates unaffected by dip and adjacent layers.

In a second aspect of the invention, another coil configuration is utilized to provide a mutual balance condition to determine the formation conductivity.

In a third aspect of the invention, a coil configuration including coils with tilted axes (with respect to a well tool's longitudinal axis) is provided to obtain directional information to determine the formation conductivity.

In a fourth aspect of the invention, an interlaced coil configuration is provided to determine the formation conductivity.

In a fifth aspect of the invention, a measurement technique is provided to determine the formation conductivity using a disclosed configuration.

In a sixth aspect of the invention, a crossed coil configuration is provided to obtain directional information to determine the formation conductivity.

In a seventh aspect of the invention, a triaxial coil configuration is provided to detecting anisotropy to determine the formation conductivity.

In an eighth aspect of the invention, a transversely disposed coil configuration is provided to obtain directional information to determine the formation conductivity.

In a ninth aspect of the invention, a measurement scheme is provided to obtain multiple depths of investigation to determine the formation conductivity.

In a tenth aspect of the invention, a reciprocal coil configuration is provided to determine the formation conductivity.

In an eleventh aspect of the invention, a method for evaluating the resistivity of formations surrounding a borehole is provided.

In a twelfth aspect of the invention, another method for evaluating the resistivity of formations surrounding a borehole is provided.

In a thirteenth aspect of the invention, a logging system is provided, including a well tool and an apparatus coupled to the tool for generating a formation conductivity profile.

3. BRIEF DESCRIPTION OF THE DRAWINGS

Other aspects and advantages of the invention will become apparent upon reading the following detailed description and upon reference to the drawings in which.

4. DETAILED DESCRIPTION OF SPECIFIC EMBODIMENTS

In the interest of clarity, not all features of actual implementation are described in this specification. It will be appreciated that although the development of any such actual implementation might be complex and time-consuming, it would nevertheless be a routine undertaking for those of ordinary skill in the art having the benefit of this disclosure.

4.1 Overview of the Problem

Figure 1:
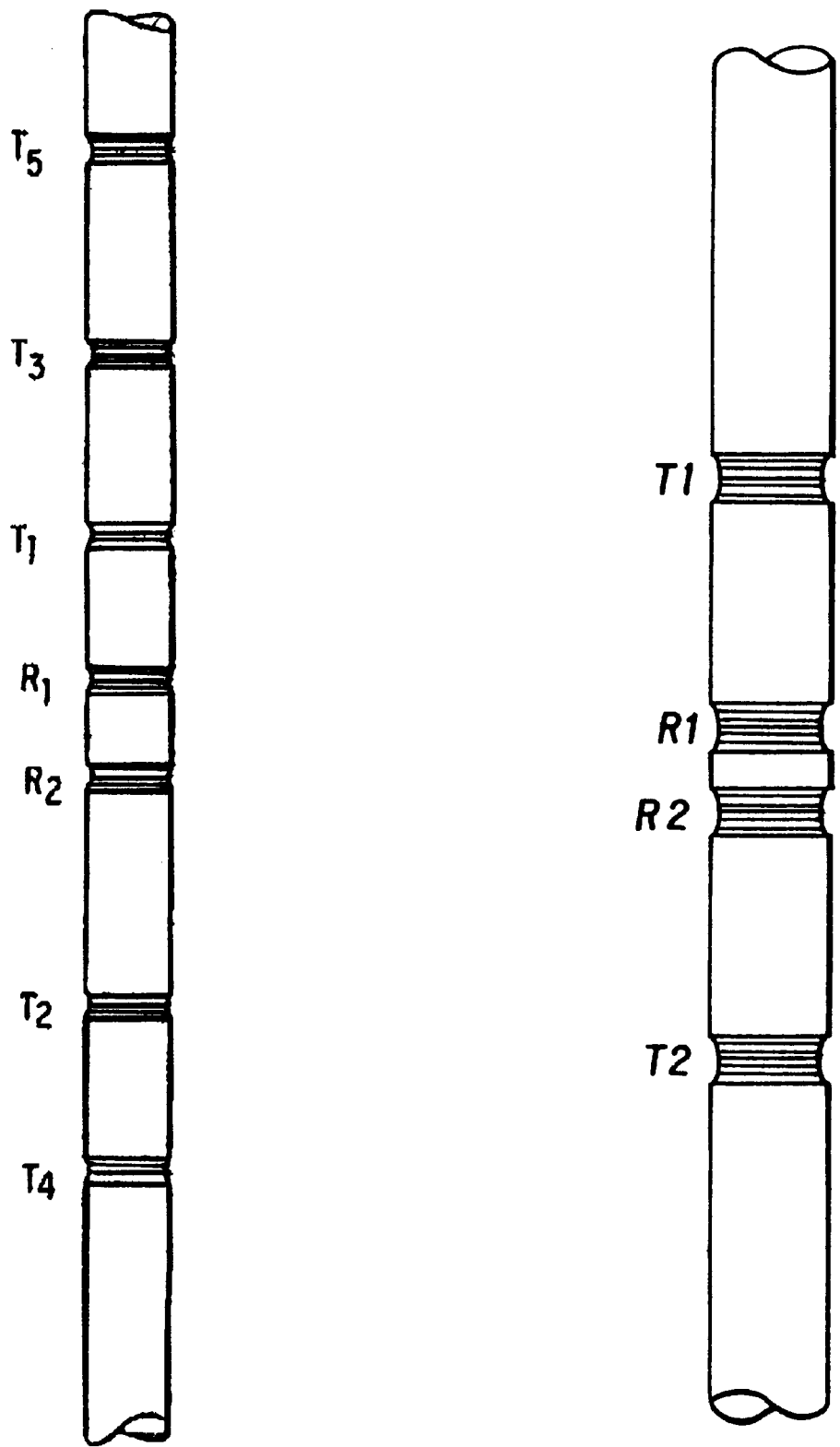
FIG. 1 is an illustration of two well tool designs for implementation of the present invention.

FIG. 1 shows the coil layouts of two logging tool designs A, B, disclosed in the '940 and '343 patents, which can be used to implement the present invention. Each tool includes at least two transmitters Tn (n>0) and at least one pair of receivers Rn (n>0). As discussed above, energy emitted into a formation by a transmitter Tn propagates in the formation and is detected by a receiver Rn as a complex-valued "phasor" voltage (not shown). Denoting the voltages detected at the receivers R1, R2 as $V_1$, $V_2$ (not shown), the processing of these measurements is based on the relative phase delay and attenuation decrement in the data received at the receivers R1, R2, viz:

$$\text{atten} + i \text{ phase} = \log(V_1/V_2), \qquad (1)$$

where log is the complex-valued logarithm and $i=\sqrt{-1}$, the unit imaginary complex number. A mathematical explanation of equation (1) is found in the '940 patent.

To evaluate the resistivity of the formation, the phase and attenuation measurements are stored and processed to produce a formation profile. Conventional processing entails comparing the measured data against values that would be recorded in an infinite uniform medium. As discussed above, these processing techniques often produce incorrect estimations as a result of contaminated measurements.

Figure 2:
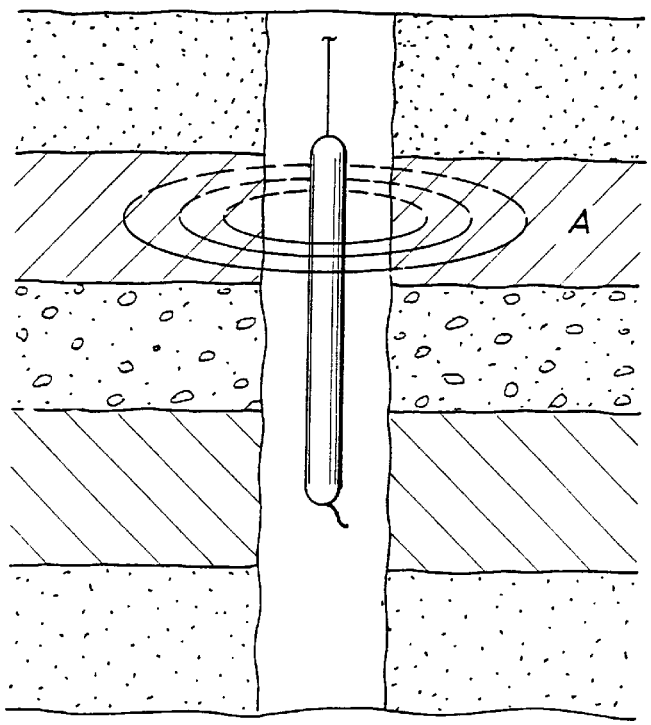
FIG. 2 shows measurements obtained with a well tool disposed in a vertical well is with uniform bedding planes.
Figure 3:
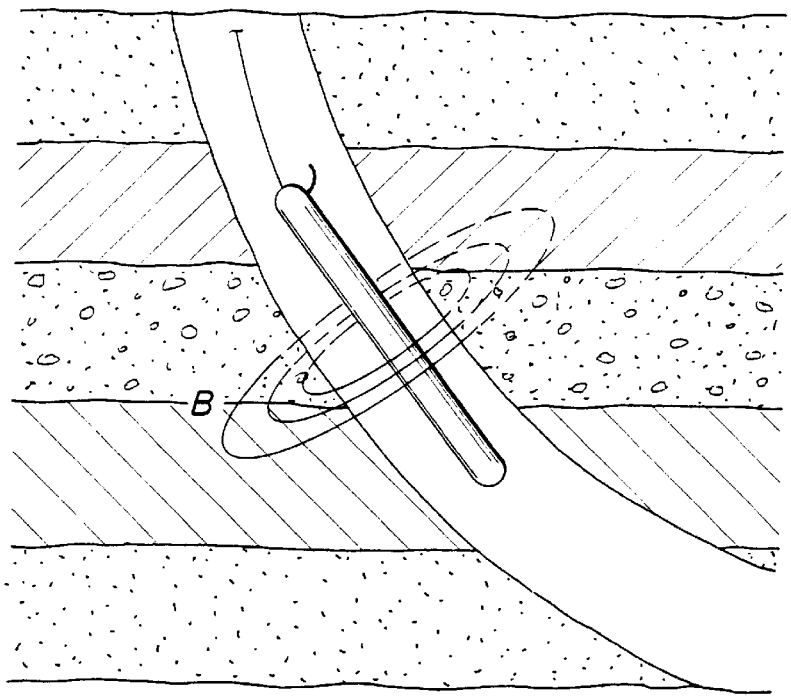
FIG. 3 shows measurements obtained with a well tool disposed in a deviated borehole, or when the formation beds dip with respect to the borehole.

FIG. 2 shows the electric field produced from a logging tool such as one shown in FIG. 1 in a vertical well with horizontal bedding. These fields do not cross the bed boundaries and the resulting log is reasonably free of artifacts. In FIG. 3, the same tool is shown disposed in a deviated borehole or when the formation beds dip with respect to the borehole. In this case the electric field lines cross the bed boundaries and the resultant log shows horns near the bed boundaries caused by transverse magnetic (TM) coupling. In both cases, the logs are strongly influenced by the presence of neighboring beds.

4.2 Mathematically-Based Solution

This section sets forth the mathematical theory underlying the present invention. The analysis presented herein is applicable to induction or propagation logging tools. For interpretation or inversion purposes, the effects of the tool and borehole are neglected (or assumed corrected) and the transmitter carries unit current (one ampere). The mathematical solution presented extends to triaxial measurements in an anisotropic layered medium that is transversely isotropic ("TI"). The transmitter and receiver coils are approximated as point dipoles with arbitrary orientation.

The approach of the present invention is based on the difference in the voltages $V_1$, $V_2$ measured at the receivers R1, R2 shown in FIG. 1, viz:

$$R\_\text{signal} + i X\_\text{signal} = V_2 - V_1. \qquad (2)$$

Mathematical analysis of the present invention begins with the solution for the response of a two-coil (one transmitter, one receiver) logging tool in a layered formation with dip.

A) Two-Coil Tool Response Using Maxwell's Equations in an Anisotropic Layered Medium In this section, the response of a basic two-coil sonde in a layered medium with anisotropy is derived using Maxwell's equations. By Fourier transforming the fields in planes parallel to the layer boundaries, the problem is reduced to the solution of two ordinary differential equations ("ODEs"). The electric and magnetic fields will be expressed in terms of two scalar Green's functions obtained by solving second-order one-dimensional ODEs.

Maxwell's equations, with time dependence $\exp(-i\omega t)$, give the following relations between the electric field E and the magnetic field H in an anisotropic medium:

$$\nabla \times E - i\omega\mu_0 \bar{\mu} \cdot H = i\omega\mu_0 \bar{\mu} \cdot M,$$

$$\nabla \times H + i\omega\epsilon_0 \bar{\epsilon} \cdot E = J, \qquad (3)$$

where J is the source current density, and M is the source magnetization density. Here $\bar{\epsilon}$ is the complex relative permittivity tensor, and $\bar{\mu}$ the relative permeability tensor. For notational and computational convenience, the fields are normalized as:

$$e = \sqrt{\epsilon_0/\mu_0} E/I, \quad h = H/I, \qquad (4)$$

where I is a reference current in the system, for example the total current in a transmitter coil. The vectors e and h have dimensions (meter)$^{-1}$. The source terms will be normalized as $$j = J/I, \quad m = M/I. \qquad (5)$$

With this notation, the basic equations (3) become $$\nabla \times e - ik\bar{\mu} \cdot h = ik\bar{\mu} \cdot m,$$

$$\nabla \times h + ik\bar{\epsilon} \cdot e = j, \qquad (6)$$

where $k = \omega\sqrt{\epsilon_0\mu_0}$ is the free-space wave number. Cartesian coordinates x, y, z are used with the z axis perpendicular to the medium layers. Unit vectors along the Cartesian coordinate axes will be denoted $u_x$, $u_y$, and $u_z$. The electrical properties of the medium depend only on z. With the assumption of TI anisotropy, the tensors $\bar{\mu}$ and $\bar{\epsilon}$ can be parametrized as follows:

$$\bar{\mu} = \frac{\mu_h}{\mu_0}(u_x u_x + u_y u_y) + \frac{\mu_v}{\mu_0} u_z u_z, \qquad (7)$$

$$\bar{\epsilon} = \left(\frac{\varepsilon_h}{\varepsilon_0} + \frac{i\sigma_h}{\omega\varepsilon_0}\right)(u_x u_x + u_y u_y) + \left(\frac{\varepsilon_v}{\varepsilon_0} + \frac{i\sigma_v}{\omega\varepsilon_0}\right) u_z u_z.$$

It is useful to separate the fields e, h and the gradient operator $\nabla$ into transverse and axial components $$e = e_\perp + u_z e_z, \qquad (8)$$

$$h = h_\perp + u_z h_z,$$

$$\nabla = \nabla_\perp + u_z \frac{\partial}{\partial z}.$$

As noted, $u_z$ is a unit vector along the z axis (perpendicular to the layer boundaries). With this notation, equation (6) can be expressed as $$\nabla_\perp \times e_\perp + \frac{\partial}{\partial z} u_z \times e_\perp - u_z \times \nabla_\perp e_z = \qquad (9)$$

$$ik\mu_\perp h_\perp + ik\mu_z h_z u_z + ik\mu_\perp m_\perp + ik\mu_z m_z u_z$$

$$\nabla_\perp \times h_\perp + \frac{\partial}{\partial z} u_z \times h_\perp - u_z \times \nabla_\perp h_z = -ik\varepsilon_\perp e_\perp - ik\varepsilon_z e_z u_z + j_\perp + j_z u_z.$$

For a layered medium, the electrical parameters $\epsilon_\perp$, $\epsilon_z$, $\mu_\perp$, and $\mu_z$ depend only on z.

Three sets of equations can be extracted from equation (9). First, a projection along the z direction gives $$u_z \times \nabla_\perp \cdot e_\perp = ik\mu_z h_z + ik\mu_z m_z,$$

$$u_z \times \nabla_\perp \cdot h_\perp = -ik\epsilon_z e_z + j_z, \qquad (10)$$

secondly, applying the operation $\nabla_{195}$ to deduce $$-\frac{\partial}{\partial z}\mathbf{u}_z \times \nabla_\perp \cdot \mathbf{e}_\perp = ik\mu_\perp \nabla_\perp \cdot \mathbf{h}_\perp + ik\mu_\perp \nabla_\perp \cdot \mathbf{m}_\perp, \quad (11)$$

$$-\frac{\partial}{\partial z}\mathbf{u}_z \times \nabla_\perp \cdot \mathbf{h}_\perp = -ik\varepsilon_\perp \nabla_\perp \cdot \mathbf{e}_\perp + \nabla_\perp \cdot \mathbf{j}_\perp,$$

thirdly, applying the operator $\mathbf{u}_z \times \nabla_{195}$ to obtain $$\frac{\partial}{\partial z}\nabla_\perp \cdot \mathbf{e}_\perp - \nabla_\perp^2 e_z = \mathbf{u}_z \times \nabla_\perp \cdot (ik\mu_\perp \mathbf{h}_\perp + ik\mu_\perp \mathbf{m}_\perp), \quad (12)$$

$$\frac{\partial}{\partial z}\nabla_\perp \cdot \mathbf{h}_\perp - \nabla_\perp^2 h_z = \mathbf{u}_z \times \nabla_\perp \cdot (-ik\varepsilon_\perp \mathbf{e}_\perp + \mathbf{j}_\perp).$$

By using the dyadic identity $$(u_x u_x + u_y u_y)\nabla_{195}^2 = \nabla_{195}\nabla_{195} + (\mathbf{u}_z \times \nabla_\perp)(\mathbf{u}_z \times \nabla_\perp), \quad (13)$$

the following relations are obtained for $e_\perp$, $h_\perp$:

$$\nabla_\perp^2 \mathbf{e}_\perp = \nabla_\perp \left[ -\frac{1}{\varepsilon_z}\frac{\partial}{\partial z}\left(\varepsilon_z e_z + \frac{i}{k}j_z\right) - \frac{i}{k\varepsilon_z}\nabla_\perp \cdot \mathbf{j}_\perp \right] + \quad (14)$$

$$\mathbf{u}_z \times \nabla_\perp \cdot [ik\mu_z h_z + ik\mu_z m_z],$$

$$\nabla_\perp^2 \mathbf{h}_\perp = \nabla_\perp \left[ -\frac{1}{\mu_z}\frac{\partial}{\partial z}(\mu_z h_z + \mu_z m_z) - \nabla_\perp \cdot \mathbf{m}_\perp \right] +$$

$$\mathbf{u}_z \times \nabla_\perp \cdot [-ik\varepsilon_z e_z + j_z].$$

One can eliminate $e_{195}$ and $h_{195}$ from equations (10–12) to obtain the following partial differential equations:

$$\left[\frac{1}{\varepsilon_z}\nabla_\perp^2 + \frac{\partial}{\partial z}\frac{1}{\varepsilon_\perp}\frac{\partial}{\partial z} + k^2\mu_\perp\right]\left(\varepsilon_z e_z + \frac{i}{k}j_z\right) = \quad (15)$$

$$\frac{i}{k\varepsilon_z}\nabla_\perp^2 j_z - \frac{i}{k}\frac{\partial}{\partial z}\left(\frac{1}{\varepsilon_\perp}\nabla_\perp \cdot \mathbf{j}_\perp\right) - ik\mu_\perp \mathbf{u}_z \times \nabla_\perp \cdot \mathbf{m}_\perp,$$

$$\left[\frac{1}{\mu_z}\nabla_\perp^2 + \frac{\partial}{\partial z}\frac{1}{\mu_\perp}\frac{\partial}{\partial z} + k^2\varepsilon_\perp\right](\mu_z h_z + \mu_z m_z) =$$

$$\nabla_\perp^2 m_z - \frac{\partial}{\partial z}(\nabla_\perp \cdot \mathbf{m}_\perp) - \mathbf{u}_z \times \nabla_\perp \cdot \mathbf{j}_\perp.$$

By Fourier transforming the dependence in the transverse direction, these equations can be reduced to ordinary differential equations in the variable z. The following notation is used for the Fourier Transform:

$$f(\underset{\rightarrow}{\rho}, z) = \frac{1}{4\pi^2}\int\int \exp(i\mathbf{q} \cdot (\underset{\rightarrow}{\rho} - \underset{\rightarrow}{\rho'}))f(\underset{\rightarrow}{\rho'}, z)d^2q d^2\rho'. \quad (16)$$

First solutions of the homogeneous one-dimensional ODEs are considered:

$$\frac{d}{dz}\frac{1}{\varepsilon_\perp}\frac{d}{dz}\psi^e + \left(k^2\mu_\perp - \frac{q^2}{\varepsilon_z}\right)\psi^e = 0, \quad (17)$$

$$\frac{d}{dz}\frac{1}{\mu_\perp}\frac{d}{dz}\psi^h + \left(k^2\varepsilon_\perp - \frac{q^2}{\mu_z}\right)\psi^h = 0.$$

Let $\Psi^{e-}$, $\Psi^{h-}$ be solutions that are regular at $z=-\infty$ and $\Psi^{e+}$, $\Psi^{h+}$ solutions that are regular at $z=+\infty$. From these solutions, one can construct Green's functions by Lagrange's method. The Green's functions are solutions of the equations $$\frac{d}{dz}\frac{1}{\varepsilon_\perp}\frac{d}{dz}\gamma^e(z, z') + \left(k^2\mu_\perp - \frac{q^2}{\varepsilon_z}\right)\gamma^e(z, z') = \delta(z - z'), \quad (18)$$

$$\frac{d}{dz}\frac{1}{\mu_\perp}\frac{d}{dz}\gamma^h(z, z') + \left(k^2\varepsilon_\perp - \frac{q^2}{\mu_z}\right)\gamma^h(z, z') = \delta(z - z').$$

The Green's functions $\gamma$ can be expressed as $$\gamma^e(z, z') = \frac{\psi^{e-}(z_<)\psi^{e+}(z_>)}{W^e}, \quad (19)$$

$$\gamma^h(z, z') = \frac{\psi^{h-}(z_<)\psi^{h+}(z_>)}{W^h},$$

where $z_< = \min(z, z')$, and $z_> = \max(z, z')$. The Wronskians $W^e$, $W^h$, defined by $$W^e = \frac{1}{\varepsilon_\perp}\left[\psi^{e-}(z)\frac{d}{dz}\psi^{e+}(z)\frac{d}{dz}\psi^{e-}(z)\right], \quad (20)$$

$$W^h = \frac{1}{\mu_\perp}\left[\psi^{h-}(z)\frac{d}{dz}\psi^{h+}(z)\frac{d}{dz}\psi^{h-}(z)\right],$$

are independent of z. Equation (19) shows that the Green's functions $\gamma$ are symmetric $$\gamma^e(z_R, z_T) = \gamma^e(z_T, z_R), \quad \gamma^h(z_R, z_T) = \gamma^h(z_T, z_R). \quad (21)$$

In using the Green's functions $\gamma(z, z)$ to solve equation (15), one should keep in mind that they have discontinuous derivatives at $z=z'$, so that, for example $$\frac{d}{dz}\int_{-\infty}^{-\infty}\gamma^e(z, z')\frac{d}{dz'}s(z')dz' = \quad (22)$$

$$-\int_{-\infty}^{+\infty}\left(\frac{\partial}{\partial z}\frac{\partial}{\partial z'}\gamma^e(z, z')\right)s(z')dz' + \varepsilon_\perp(z)s(z).$$

With the aid of the Green's functions $\gamma$, the solution of equation (15) can be represented as $$\varepsilon_z(z)e_z(\rho, z) + \frac{i}{k}j_z(\rho, z) = \frac{1}{4\pi^2 k} \quad (23)$$

$$\int\int\int \exp(i\mathbf{q} \cdot (\underset{\rightarrow}{\rho} - \underset{\rightarrow}{\rho'}))\left\{\gamma^e(z, z')\left[-\frac{iq^2}{\varepsilon_z}j_z + k^2\mu_\perp \mathbf{u}_z \times \mathbf{q} \cdot \mathbf{m}_\perp\right] - \right.$$

$$\left.\left(\frac{\partial}{\partial z'}\gamma^e(z, z')\right)\left[\frac{1}{\varepsilon_\perp}\mathbf{q} \cdot \mathbf{j}_\perp\right]\right\}d^2q d^2\rho' dz',$$

$$\mu_z(z)h_z(\rho, z) + \mu_z(z)m_z(\rho, z) = \frac{1}{4\pi^2}$$

$$\int\int\int \exp(i\mathbf{q} \cdot (\underset{\rightarrow}{\rho} - \underset{\rightarrow}{\rho'}))\{\gamma^h(z, z')[-q^2 m_z - i\mathbf{u}_z \times \mathbf{q} \cdot \mathbf{j}_\perp] +$$

$$i\left(\frac{\partial}{\partial z'}\gamma^h(z, z')\right)[\mathbf{q} \cdot \mathbf{m}_\perp]\}d^2q d^2\rho' dz'.$$

The terms in square brackets in the integrand are evaluated at p', z'. By using equation (23) in equation (14), one obtains the following integral representations for $e_{195}$ and $h_{195}$:

$$\mathbf{e}_\perp(\rho, z) = \frac{1}{4\pi^2}\int\int\int \exp(i\mathbf{q} \cdot (\underset{\rightarrow}{\rho} - \underset{\rightarrow}{\rho'})) \quad (24)$$

$$\left\{\frac{i}{k\varepsilon_\perp}\mathbf{q}\left(\frac{\partial}{\partial z}\gamma^e(z, z')\right)\left[-\frac{iq^2}{\varepsilon_z}j_z + k^2\mu_\perp \mathbf{u}_z \times \mathbf{q} \cdot \mathbf{m}_\perp\right] - \right.$$

-continued $$\frac{i}{k\varepsilon_\perp}\mathbf{q}\left(\frac{\partial}{\partial z}\frac{\partial}{\partial z'}\gamma^e(z,z')\right)\left[\frac{1}{\varepsilon_\perp}\mathbf{q}\cdot\mathbf{j}_\perp\right]+$$

$$k\mathbf{u}_z\times\mathbf{q}\gamma^h(z,z')[-q^2m_z-i\mathbf{u}_z\times\mathbf{q}\cdot\mathbf{j}_\perp]+$$

$$ik\mathbf{u}_z\times\mathbf{q}\left(\frac{\partial}{\partial z'}\gamma^h(z,z')\right)[\mathbf{q}\cdot\mathbf{m}_\perp]\bigg\}\frac{1}{q^2}d^2q\,d^2\rho'dz',$$

$$\mathbf{h}_\perp(\rho,z)=\frac{1}{4\pi^2}\int\int\int\exp\left(i\mathbf{q}\cdot(\underset{\rightarrow}{\rho}-\underset{\rightarrow}{\rho}')\right)$$

$$\left\{-\mathbf{u}_z\times\mathbf{q}\gamma^e(z,z')\left[-\frac{iq^2}{\varepsilon_z}j_z+k^2\mu_\perp\mathbf{u}_z\times\mathbf{q}\cdot\mathbf{m}_\perp\right]+\right.$$

$$\mathbf{u}_z\times\mathbf{q}\left(\frac{\partial}{\partial z}\frac{\partial}{\partial z'}\gamma^e(z,z')\right)\left[\frac{1}{\varepsilon_\perp}\mathbf{q}\cdot\mathbf{j}_\perp\right]+$$

$$\frac{i}{\mu_\perp}\mathbf{q}\left(\frac{\partial}{\partial z}\gamma^h(z,z')\right)[-q^2m_z-i\mathbf{u}_z\times\mathbf{q}\cdot\mathbf{j}_\perp]-$$

$$\left.\frac{i}{\mu_\perp}\mathbf{q}\left(\frac{\partial}{\partial z}\frac{\partial}{\partial z'}\gamma^h(z,z')\right)[\mathbf{q}\cdot\mathbf{m}_\perp]\right\}\frac{1}{q^2}d^2q\,d^2\rho'dz'.$$

Not shown are two contributions from each of the source terms $\mathbf{q}\cdot\mathbf{j}_\perp$ and $\mathbf{q}\cdot\mathbf{m}_\perp$, which vanish because of equation (22). The fields e and h, at any point in the layered medium for arbitrary excitation, can be computed with the integral representations in equations (23–24).

B) Measurements with Triaxial Magnetic Dipole Antennas

For interpretation purposes, the behavior of induction and propagation logging tools can usually be predicted with sufficient accuracy by neglecting the finite size of the transmitter and receiver coils, and treating them as point magnetic dipoles. A small transmitter coil located at $p_T$, $z_T$ can be represented by the source term $$\mathbf{m}_T=\mathbf{u}_T A_T\delta\left(\underset{\rightarrow}{\rho}-\underset{\rightarrow}{\rho}_T\right)\delta(z-z_T), \tag{25}$$

where $A_T$ is the effective cross-sectional area of the transmitter coil, and $\mathbf{u}_T$ is a unit vector along the transmitter coil axis. The open-circuit voltage induced in a receiver coil can be approximated by $$V=\oint\mathbf{E}\cdot d\mathbf{r}=Z_0I\int\mathbf{n}\cdot\nabla\times\mathbf{e}dS=ikZ_0I= \tag{26}$$

$$\int\mathbf{n}\cdot(\mu_\perp\mathbf{h}_\perp+\mu_z\mathbf{u}_z h_z)dS$$

$$=ikZ_0IA_R\mathbf{u}_R\cdot\left[\mu_\perp\mathbf{h}_\perp\left(\underset{\rightarrow}{\rho}_R,z_R\right)+\mu_z\mathbf{u}_z h_z\left(\underset{\rightarrow}{\rho}_R,z_R\right)\right],$$

where $A_R$ is the cross-sectional area of the receiver coil, and $\mathbf{u}_R$ is a unit vector along the receiver coil axis. Here $Z_0=\sqrt{\mu_0/\varepsilon_0}=376.7$ ohms is the impedance of free space. This relationship can be expressed in terms of tensor transfer impedance $\bar{Z}_{RR}^{hh}$, $$V=I\mathbf{u}_R\cdot\bar{Z}_{RT}^{hh}\cdot\mathbf{u}_T. \tag{27}$$

The following integral representation for $\bar{Z}_{RT}^{hh}$ can be obtained from equations (23–24):

$$\bar{Z}_{RT}^{hh}=\frac{ikZ_0A_RA_T}{4\pi^2}\int\exp\left(i\mathbf{q}\cdot\left(\underset{\rightarrow}{\rho}_R-\underset{\rightarrow}{\rho}_T\right)\right)\left\{q^2\mathbf{u}_z\mathbf{u}_z\gamma^h(z_R,z_T)-\right. \tag{28}$$

$$i\mathbf{q}\mathbf{u}_z\left(\frac{\partial}{\partial z_T}\gamma^h(z_R,z_T)\right)i\mathbf{u}_z\mathbf{q}\left(\frac{\partial}{\partial z_R}\gamma^h(z_R,z_T)\right)+$$

$$\left.\frac{1}{q^2}\mathbf{q}\mathbf{q}\left(\frac{\partial}{\partial z_R}\frac{\partial}{\partial z_T}\gamma^h(z_R,z_T)\right)+\frac{k^2}{q^2}\mathbf{u}_z\times\mathbf{q}\mathbf{u}_z\times\right.$$

$$\left.\mathbf{q}\mu_\perp(z_R)\mu_\perp(z_T)\gamma^e(z_R,z_T)\right\}d^2q.$$

It is seen that $\bar{Z}_{RT}^{hh}$ is not a symmetric tensor. Electromagnetic reciprocity implies that $\bar{Z}_{TR}^{hh}$ is the transpose of $\bar{Z}_{RT}^{hh}$. The integration in equation (28) can be parametrized as follows:

$$\underset{\rightarrow}{\rho}_R-\underset{\rightarrow}{\rho}_T=\rho\mathbf{u}_x, \tag{29}$$

$$\mathbf{q}=q\cos\phi\mathbf{u}_x+q\sin\phi\mathbf{u}_y,$$

$$\mathbf{u}_z\times\mathbf{q}=-q\sin\phi\mathbf{u}_x+q\cos\phi\mathbf{u}_y,$$

giving $$\bar{Z}_{RT}^{hh}=\frac{ikZ_0A_RA_T}{4\pi^2}\int_0^{2\pi}\int_0^\infty\exp(iq\rho\cos\phi)\{q^2\mathbf{u}_z\mathbf{u}_z\gamma^h(z_R,z_T)- \tag{30}$$

$$iq\cos\phi\mathbf{u}_x\mathbf{u}_z\frac{\partial}{\partial z_T}\gamma^h(z_R,z_T)+iq\cos\phi\mathbf{u}_z\mathbf{u}_x\frac{\partial}{\partial z_R}\gamma^h(z_R,z_T)+$$

$$(u_xu_x\cos^2\phi+u_yu_y\sin^2\phi)\left(\frac{\partial}{\partial z_R}\frac{\partial}{\partial z_T}\gamma^h(z_R,z_T)\right)+$$

$$(u_xu_x\sin^2\phi+$$

$$u_yu_y\cos^2\phi)k^2\mu_\perp(z_R)\mu_\perp(z_T)\gamma^e(z_R,z_T)\}q\,dq\,d\phi.$$

The integration over $\phi$ leads to Bessel functions of the first kind $$\frac{1}{\pi}\int_0^\pi e^{ix\cos\phi}d\phi=J_0(x), \tag{31}$$

$$\frac{1}{\pi}\int_0^\pi e^{ix\cos\phi}\cos\phi\,d\phi=iJ_1(x),$$

$$\frac{1}{\pi}\int_0^\pi e^{ix\cos\phi}\sin^2\phi\,d\phi=\frac{J_1(x)}{x}=\frac{1}{2}[J_0(x)+J_2(x)],$$

$$\frac{1}{\pi}\int_0^\pi e^{ix\cos\phi}\cos^2\phi\,d\phi=J_1'(x)=\frac{1}{2}[J_0(x)+J_2(x)].$$

Odd functions of $\phi$ integrate to zero $$\int_0^{2\pi}e^{ix\cos\phi}\sin\phi d\phi=0, \tag{32}$$

$$\int_0^{2\pi}e^{ix\cos\phi}\sin\phi\cos\phi d\phi=0.$$

Thus $\bar{Z}_{RT}^{hh}$ can be expressed as $$\bar{Z}_{RT}^{hh}=-\frac{ikZ_0A_RA_T}{2\pi}\int_0^\infty\{q^2J_0(q\rho)\mathbf{u}_z\mathbf{u}_z\gamma^h(z_R,z_T)+ \tag{33}$$

$$qJ_1(q\rho)\mathbf{u}_x\mathbf{u}_z\frac{\partial}{\partial z_T}\gamma^h(z_R,z_T)-$$

$$qJ_1(q\rho)\mathbf{u}_z\mathbf{u}_x\frac{\partial}{\partial z_R}\gamma^h(z_R,z_T)+$$

$$\left(J_1'(q\rho)\mathbf{u}_x\mathbf{u}_x+\frac{J_1(q\rho)}{q\rho}\mathbf{u}_y\mathbf{u}_y\right)\left(\frac{\partial}{\partial z_R}\frac{\partial}{\partial z_T}\gamma^h(z_R,z_T)\right)+$$

-continued $$\left(\frac{J_1(q\rho)}{q\rho}\mathbf{u}_x\mathbf{u}_x + J_1'(q\rho)\mathbf{u}_y\mathbf{u}_y\right)k^2\mu_\perp(z_R)\mu_\perp(z_T)\gamma^e(z_R, z_T)\right\}qdq.$$

From equation (29), $\rho$, $z_R$, and $z_T$ are related by $$\rho = |p_T - p_R| = |z_T - z_R|\tan\alpha, \quad (34)$$

where $\alpha$ is the dip angle. When $\alpha$ is larger than about 45 degrees, the convergence of the integral is slow, and it is then advantageous to use contour integration in the complex plane of q. By using the relations $$J_0(x) = \frac{1}{2}[H_0^{(1)}(x) - H_0^{(1)}(xe^{i\pi})], \quad J_1(x) = \frac{1}{2}[H_1^{(1)}(x) - H_1^{(1)}(xe^{i\pi})], \quad (35)$$

equation (33) can be written as a contour integral, where the path of integration C must lie above the origin and below the singularities of $\gamma^e$ and $\gamma^h$, $$\widetilde{Z}_{RT}^{hh} = -\frac{ikZ_0A_RA_T}{4\pi}\int_C \left\{q^2H_0^{(1)}(q\rho)\mathbf{u}_z\mathbf{u}_z\gamma^h(z_R, z_T) + \right. \tag{36}$$

$$qH_1^{(1)}(q\rho)\mathbf{u}_x\mathbf{u}_z\frac{\partial}{\partial z_T}\gamma^h(z_R, z_T) -$$

$$qH_1^{(1)}(q\rho)\mathbf{u}_z\mathbf{u}_x\frac{\partial}{\partial z_R}\gamma^h(z_R, z_T) +$$

$$\left(H_1^{(1)'}(q\rho)\mathbf{u}_x\mathbf{u}_x + \frac{H_1^{(1)}(q\rho)}{q\rho}\mathbf{u}_y\mathbf{u}_y\right)\left(\frac{\partial}{\partial z_R}\frac{\partial}{\partial z_T}\gamma^h(z_R, z_T)\right) +$$

$$\left.\left(\frac{H_1^{(1)}(q\rho)}{q\rho}\mathbf{u}_x\mathbf{u}_x + H_1^{(1)'}(q\rho)\mathbf{u}_y\mathbf{u}_y\right)\right.$$

$$k^2\mu_\perp(z_R)\mu_\perp(z_T)\gamma^e(z_R, z_T)\bigg\}qdq.$$

As noted in equation (21), the Green's functions $\gamma$ are symmetric:

$$\gamma^e(z_R, z_T) = \gamma^e(z_T, z_R), \quad \gamma^h(z_R, z_T) = \gamma^h(z_T, z_R). \quad (37)$$

From equation (18), it is seen that $\gamma^e$ and $\gamma^h$ satisfy the following partial differential equations:

$$\left(\varepsilon_z(z_R)\frac{\partial}{\partial z_R}\frac{1}{\varepsilon_\perp(z_R)}\frac{\partial}{\partial z_R} - \varepsilon_z(z_T)\frac{\partial}{\partial z_T}\frac{1}{\varepsilon_\perp(z_T)}\frac{\partial}{\partial z_T}\right)\gamma^e(z_R, z_T) = \tag{38}$$

$$-k^2(\varepsilon_z(z_R)\mu_\perp(z_R) - \varepsilon_z(z_T)\mu_\perp(z_T))\gamma^e(z_R, z_T),$$

$$\left(\mu_z(z_R)\frac{\partial}{\partial z_R}\frac{1}{\mu_\perp(z_R)}\frac{\partial}{\partial z_R} - \mu_z(z_T)\frac{\partial}{\partial z_T}\frac{1}{\mu_\perp(z_T)}\frac{\partial}{\partial z_T}\right)\gamma^h(z_R, z_T) =$$

$$-k^2(\varepsilon_\perp(z_R)\mu_z(z_R) - \varepsilon_\perp(z_T)\mu_z(z_T))\gamma^h(z_R, z_T).$$

If the transmitter and receiver coils are both in a uniform layer with no z variation, one simply gets $$\left(\frac{\partial^2}{\partial z_R^2} - \frac{\partial^2}{\partial z_T^2}\right)\gamma^e(z_R, z_T) = 0, \tag{39}$$

$$\left(\frac{\partial^2}{\partial z_R^2} - \frac{\partial^2}{\partial z_T^2}\right)\gamma^h(z_R, z_T) = 0.$$

The partial derivatives can be factored as $$\left(\frac{\partial}{\partial z_R} + \frac{\partial}{\partial z_T}\right)\left(\frac{\partial}{\partial z_R} - \frac{\partial}{\partial z_T}\right)\gamma^e(z_R, z_T) = 0, \tag{40}$$

$$\left(\frac{\partial}{\partial z_R} + \frac{\partial}{\partial z_T}\right)\left(\frac{\partial}{\partial z_R} - \frac{\partial}{\partial z_T}\right)\gamma^h(z_R, z_T) = 0.$$

The desired result is that $$\left(\frac{\partial}{\partial z_R} - \frac{\partial}{\partial z_T}\right)\gamma^e(z_R, z_T) = C^e, \tag{41}$$

$$\left(\frac{\partial}{\partial z_R} - \frac{\partial}{\partial z_T}\right)\gamma^h(z_R, z_T) = C^h,$$

where $C^e$ and $C^h$ are independent of $(z_R+z_T)/2$, i.e., independent of the tool position. In a sufficiently thick layer, $C^e$ and $C^h$ will have the same values as in an infinite uniform medium.

In a uniform layer, these quantities can be evaluated analytically. Suppose that the electrical parameters $\varepsilon_\perp$, $\mu_\perp$ are independent of z in an interval $z_L < z_T < z_R < z_H$. The solutions $\Psi^-$, $\Psi^+$, from equation (17), have the form $$\Psi^- = A^-(e^{\beta z} + R^- e^{-\beta(z-2z_L)}),$$

$$\Psi^+ = A^+(e^{-\beta z} + R^+ e^{\beta(z-2z_H)}), \tag{42}$$

with $\beta = \beta^e$ or $\beta = \beta^h$, where $$\beta^e = \sqrt{\frac{\varepsilon_\perp}{\varepsilon_z}q^2 - \varepsilon_\perp\mu_\perp k^2}, \tag{43}$$

$$\beta^h = \sqrt{\frac{\mu_\perp}{\mu_z}q^2 - \varepsilon_\perp\mu_\perp k^2},$$

choosing the branch of the square root that makes real $(\beta) \geq 0$. Equation (19) gives $$\left(\frac{\partial}{\partial z_R} - \frac{\partial}{\partial z_T}\right)\gamma^e(z_R, z_T) = \varepsilon_\perp e^{-\beta(z_R - z_T)}\frac{1 - R^-R^+ e^{-2\beta(z_H - z_L - z_R + z_T)}}{1 - R^-R^+ e^{-2\beta(z_H - z_L)}}, \tag{44}$$

and a similar expression for $\gamma^h$. If $R^- = 0$ or $R^+ = 0$, we get the same result as in an infinite uniform medium. In particular, a semi-infinite uniform layer gives the same result as the infinite uniform medium. The first order terms in the reflection coefficients $R^-$, $R^+$ cancel; only the product $R^-R^-$ survives. Generally, the magnitude of reflection coefficients is smaller than unity. The exponential factor provides further attenuation since real $(\beta) \geq 0$. Thus one can expect that, in a thick layer, $$|R^-R^+ e^{-2\beta(z_H - z_L)}| < |R^-R^+ e^{-2\beta(z_H - z_L - z_R + z_T)}| << 1, \tag{45}$$

giving approximately the same result as an infinite uniform medium. It is seen that the partial derivatives in equation (41) suppress reflected waves to first order, which leads to reduced shoulder effect in the estimated conductivity.

These relations are now expressed in terms of the tool log depth h (measured along the borehole):

$$z_r = h_R \cos\alpha,$$

$$z_T = h_T \cos\alpha, \tag{46}$$

$$\left(\frac{\partial}{\partial h_R} - \frac{\partial}{\partial h_T}\right)\gamma^e(z_R, z_T) = C^e\cos\alpha, \tag{47}$$

$$\left(\frac{\partial}{\partial h_R} - \frac{\partial}{\partial h_T}\right)\gamma^h(z_R, z_T) = C^h \cos\alpha,$$

where $\alpha$ is the dip angle. The horizontal separation p can be expressed as $p = |h_R - h_T| \sin\alpha$. For any function of p, the expression $$\left(\frac{\partial}{\partial h_R} - \frac{\partial}{\partial h_T}\right)J(q\rho) = 2\text{sign}(h_R - h_T)\sin\alpha \frac{\partial}{\partial \rho}J(q\rho) \quad (48)$$

is independent of the tool log depth $(h_R + h_T)/2$. This information allows one to conclude that, if the transmitter and receiver coils are in a uniform layer, $$\left(\frac{\partial}{\partial h_R} - \frac{\partial}{\partial h_T}\right)\overline{Z}_{RT}^{hh} = \text{constant} \quad (49)$$

will be independent of the tool position. Differentiation under the integral signs in equation (33) or (36) is permissible because the integrand has the necessary smoothness and convergence properties. The constant tensor in equation (49) will be the same as in an infinite uniform medium provided the layer is sufficiently thick.

Inspection of the x-z cross-coupling terms of equation (36) gives another invariant:

$$u_z \cdot \overline{Z}_{RT}^{hh} \cdot u_x + u_x \cdot \overline{Z}_{RT}^{hh} \cdot u_z = \quad (50)$$
$$\frac{ikZ_0 A_R A_T}{4\pi}\int_C qH_1^{(1)}(q\rho)\left(\frac{\partial}{\partial z_R} - \frac{\partial}{\partial z_T}\right)\gamma^h(z_R, z_T)qdq = \text{constant}.$$

C) Infinite Homogeneous Response

Explicit solutions are easily obtained for an infinite homogeneous medium. The solutions of equation (17) are exponential functions $$\Psi^{e\pm} = \exp(\mp\beta^e z), \quad \Psi^{h\pm} = \exp(\mp\beta^h z), \quad (51)$$

Where $$\beta^e = \sqrt{\frac{\varepsilon_\perp}{\varepsilon_z}q^2 - \varepsilon_\perp \mu k^2}, \; \text{real}(\beta^e) \geq 0, \quad (52)$$

$$\beta^h = \sqrt{\frac{\mu_\perp}{\mu_z}q^2 - \varepsilon_\perp \mu k^2}, \; \text{real}(\beta^h) \geq 0. \quad (53)$$

The branch of the square root that makes real($\beta$) nonnegative is used. The Green's functions $\gamma$, evaluated from equation (19), are $$\gamma^e(z_R, z_T) = -\frac{\varepsilon_\perp}{2\beta^e}\exp(-\beta^e|z_R - z_T|), \quad (54)$$

$$\gamma^h(z_R, z_T) = -\frac{\mu_\perp}{2\beta^h}\exp(-\beta^h|z_R - z_T|).$$

The Fourier transforms of $\gamma^e$ and $\gamma^h$ can be expressed in terms of elementary functions, $$g^e(\rho_R, z_R, \rho_T, z_T) = \frac{1}{4\pi^2}\int \exp\left(iq\cdot(\rho_R - \rho_T)\right)\gamma^e(z_R, z_T)d^2q \quad (55)$$
$$= -\frac{1}{4\pi}\int_0^\infty J_0(q\rho)\frac{\varepsilon_\perp}{\beta^e}\exp(-\beta^e|z_R - z_T|)qdq$$
$$= -\frac{\varepsilon_\perp}{4\pi r^e}\exp(ikr^e\sqrt{\mu_\perp \varepsilon_\perp}),$$

$$g^h(\rho_R, z_R, \rho_T, z_T) = \frac{1}{4\pi^2}\int \exp\left(iq\cdot(\rho_R - \rho_T)\right)\gamma^h(z_R, z_T)d^2q \quad (56)$$
$$= -\frac{1}{4\pi}\int_0^\infty J_0(q\rho)\frac{\varepsilon_\perp}{\beta^e}\exp(-\beta^e|z_R - z_T|)qdq$$
$$= -\frac{\varepsilon_2}{4\pi r^e}\exp(ikr^h\sqrt{\mu_\perp \varepsilon_\perp}),$$

where $$r^e = \left[\frac{\varepsilon_z}{\varepsilon_\perp}|\rho_R - \rho_T|^2 + |z_R - z_T|^2\right]^{\frac{1}{2}}, \quad (57)$$

$$r^h = \left[\frac{\mu_z}{\mu_\perp}|\rho_R - \rho_T|^2 + |z_R - z_T|^2\right]^{\frac{1}{2}}.$$

The transfer impedance $\overline{Z}^{RThh}$ in equation (33), for $z_R \geq z_T$, becomes simply $$\overline{Z}^{hh} = -\frac{ikZ_0 A_R A_T}{4\pi^2}\int_0^\infty \{q^2 J_0(q\rho)u_z u_z \exp(-\beta^h|z_R - z_T|) + \quad (58)$$
$$qJ_1(q\rho)(u_x u_z + u_z u_x)\exp(-\beta^h|z_R - z_T|) -$$
$$\left(J_1'(q\rho)u_x u_x + \frac{J_1(q\rho)}{q\rho}u_y u_y\right)\beta^h \exp(-\beta^h|z_R - z_T|)$$
$$\left(\frac{J_1(q\rho)}{q\rho}u_x u_x + J_1'(q\rho)u_y u_y\right)\frac{k^2 \varepsilon_\perp \mu_\perp}{\beta^e}\exp(-\beta^e|z_R - z_T|)\}qdq.$$

These integrals can also be expressed in terms of elementary functions.

4.3 Inferences from the Analysis

Certain inferences can be drawn from the analysis. The partial derivatives in equation (49) can be approximated by a finite difference, varying the separation between the transmitter and receiver in a two-coil sonde. Let $V(h_R, h_T)$ denote the phasor voltage measured at the receiver coil of the two-coil sonde, where $h_R$, $h_T$ are the positions of the two coils measured downward along the tool's axis. If the transmitter current is I amperes, we have, from equation (27), $$V(h_R, h_T) = Iu_R \cdot \overline{Z}_{RT}^{hh} \cdot u_T. \quad (59)$$

Because of EM reciprocity, the same voltage V is obtained if one interchanges the role of transmitter and receiver in a two-coil measurement. If the transmitter and receiver coils are identical, their positions may also be interchanged:

$$V(h_T, h_R) = V(h_R, h_T). \quad (60)$$

If the two coils are in a uniform layer, the quantity $$D_G(h_R - h_T) = \frac{\partial}{\partial h_t}V(h_R, h_T) - \frac{\partial}{\partial h_r}V(h_R, h_T) \quad (61)$$

is independent of $h_R + h_T$, as shown in equation (49). In a sufficiently thick uniform layer, $D_G$ will have the same value as in an infinite homogeneous medium, i.e., it will be unaffected by adjacent layers in the formation. The formation conductivity may be estimated by comparing the measured data for $D_G$ against values (obtained from theoretical modeling) that would be obtained in an infinite uniform medium. For an isotropic formation, the dip angle is not required to estimate the conductivity.

The quantity $D_G$ is a sort of generalized derivative. It is the difference between the change in coupling with respect to movement of the transmitter ($h_T$) and the change in coupling with respect to movement of the receiver ($h_R$). That this quantity is independent of $h_R + h_T$ means that it remains constant as the tool moves, so long as the entire tool remains in the bed.

Figure 4:
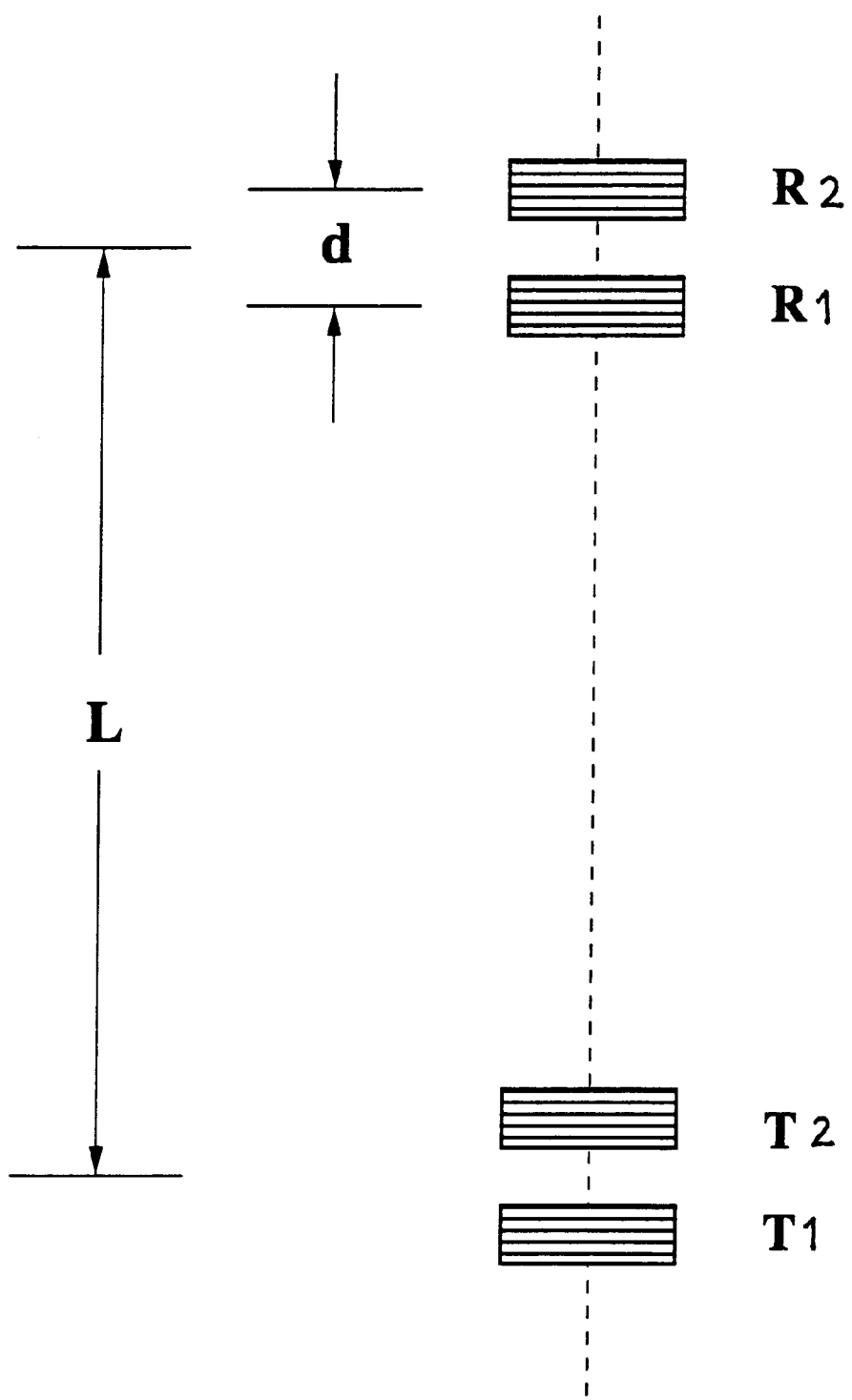
FIG. 4 is a schematic diagram of a coil configuration in accord with the present invention.

FIG. 4 shows a conceptual measurement that is used to exploit this relationship. The separation L between the transmitter and receiver coils in a two-coil sonde is varied by a small amount, while the midpoint between the transmitter and receiver coils is held fixed. For purposes of illustration, dashed lines in the figures presented herein represent the tool axis. Equation (61) shows that the difference in the measured voltage is independent of position if all the coils are in a uniform layer. In a thick bed, the voltage difference is not affected by the shoulder beds, even in the presence of dip.

Equation (49) shows that this inference is applicable to electric or magnetic dipole transmitters and receivers disposed at any angle along a borehole axis. Thus, the techniques of the present invention are germane to tools with crossed or tilted coils, or triaxial coils (discussed below), or transverse coils (discussed below), as well as tools with non-tilted (axial) coils.

The accuracy requirements on the measurements are more stringent for the present invention than for conventional processing techniques used in LWD or wireline operations. Accurate measurement of the absolute phases and voltages is important, particularly at low conductivities. Efficient implementation of the disclosed techniques may require modification to a tool's electronics (as known in the art) in order to obtain an absolute phase and voltage measurement. Borehole effects will also have more impact on the disclosed techniques as compared to conventional processing, but may be correctable.

4.4 Specific Configurations

Referring to FIG. 4, a coil configuration in accordance with the present invention is shown. The dashed line represents the tool's longitudinal axis. Effective implementation of the measurement technique uses at least two receivers R1, R2 and at least two transmitters T1, T2. Ideally, the two transmitters T1, T2 are identical, carry the same current I, in phase, and at the same frequency (not shown). Although typical EM propagation tools are operated at frequencies in the range of 400 kHz to 2 MHz, the techniques of the present invention are not limited to any particular frequency.

The two receiver coils R1, R2 are also ideally identical, but may differ from the transmitter coils T1, T2. The receivers R1, R2 are separated from one another by a spacing d. The receiver R1, R2 spacing d impacts the vertical resolution of the measurements, but the resolution is dominated by the transmitter-receiver spacing L. The spacing d may be relatively small; a useful receiver R1, R2 spacing d is six inches. The transmitters T1, T2 are also closely spaced and may be separated from one another by the same spacing d. The distance L between the transmitters T1, T2 and receivers R1, R2 impacts the radial depth of investigation and is preferably larger than the spacing d. For a fixed receiver pair spacing d, as the transmitter-receiver distance L is increased, the corresponding transmitter T1, T2 power should be increased to get a satisfactory signal-to-noise ratio. The aforementioned spacing conditions are applicable to the disclosed embodiments of the present invention.

In operation, activation of the transmitters T1, T2 (to transmit EM energy into a formation) and receivers R1, R2 (to measure the energy and develop voltage data) is implemented in a manner well-known by those skilled in the art and described in the '343 and '940 patents. The transmitters T1, T2 are alternately energized one at a time to transmit EM energy into a formation. Voltage data, associated with the transmitted energy through interaction with the borehole and formation, is received at the receivers R1, R2. R_signal and Xsignal voltage data corresponding to the measured amplitude and phase are then stored for each transmitter T1, T2 by means known in the art and described in the '343 and '940 patents.

Still referring to FIG. 4, the following quantity can be measured and used as an estimate of $D_G$ in equation (61):

$$D_G = \frac{1}{d}(V_{21} - V_{12}), \tag{62}$$

where $V_{21}$ is the voltage data stored as received on receiver R2 when transmitter T1 is active, and $V_{12}$ the voltage data stored as received on receiver R1 when transmitter T2 is active. This estimate of $D_G$ will be independent of position in a uniform layer. The conductivity profile can then be derived by inversion of $D_G$ as described below.

The determination of the formation conductivity from $D_G$, herein referred to as homogeneous medium inversion, may be derived in different ways. The formation conductivity can be determined from $D_G$, for example, by establishing a table of voltage data values associated with formation conductivity values (based on theoretical modeling) and looking up $D_G$ within the table to reference a conductivity value.

Alternatively, the formation conductivity may be obtained by performing a least squares fit using the measured data. Using a weighted least squares criterion, one can minimize $$E = w_1 [\text{real}(D_G^{homog}(\sigma_f) - D_G^{meas})]^2 + (1-w_1)[\text{imag}(D_G^{homog}(\sigma_f) - D_G^{meas})]^2, \tag{63}$$

where $D_G^{meas}$ denotes the measured value of $D_G$ in equation (62). $D_G^{homog}$ is obtained from a model calculation of the response in an infinite homogeneous formation of conductivity $\sigma_f$. The constant weight $w_1$, $0 \leq w_1 \leq 1$, can be adjusted to give more or less emphasis to the real part of $D_G^{meas}$. Alternatively, one can minimize the difference between the phase or amplitude of $D_G^{meas}$ and the phase or amplitude of $D_G^{homog}$. It will be appreciated by those skilled in the art that the techniques disclosed herein may be implemented in other ways. For example, an alternative approach for estimating the formation conductivity may be based on processing the magnitude and phase of $(V_2 - V_1)/V_1$.

Figure 5:
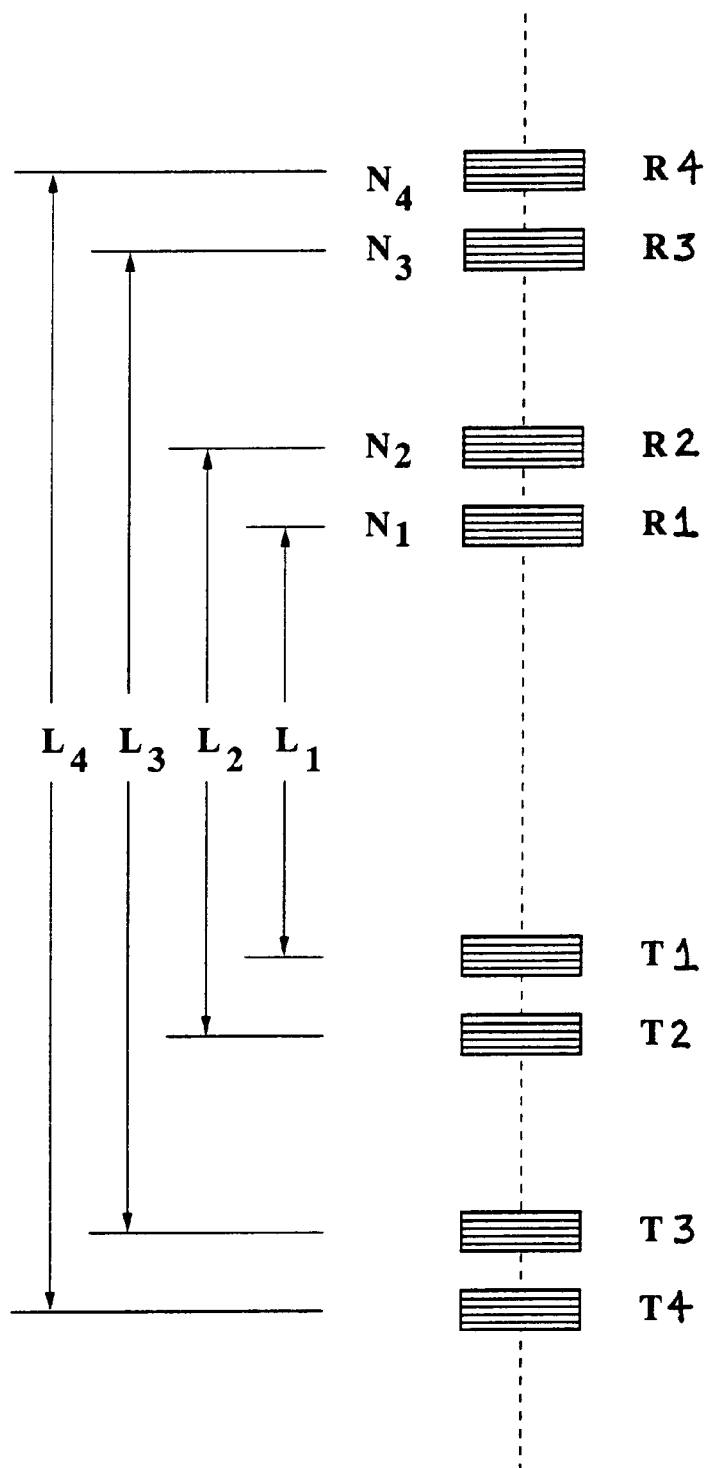
FIG. 5 is another schematic diagram of a coil configuration in accord with the present invention.

FIG. 5 illustrates an alternative coil configuration that may be used to implement the present invention. By using four transmitters Tn (n=1,2,3,4) having the 1 same number of turns, and four receivers Rn (n=1,2,3,4) with an appropriate number of turns, the primary field can be cancelled. This produces zero signal in a vacuum and is known as a mutual balance condition. The mutually balanced configuration allows for the detection of very low conductivities, i.e., very resistive formations.

The receiver pairs have equal and opposite coil turn $N_n$:

$$N_2 = -N_1, N_4 = -N_3. \tag{64}$$

The ratio $N_3/N_1$ is chosen to cancel the primary field:

$$\frac{N_3}{N_1} = -\frac{L_1^{-3} - L_2^{-3}}{L_3^{-3} - L_4^{-3}}. \tag{65}$$

An estimate of $D_G$ can then be calculated by $$D_G = \frac{1}{d}\frac{N_1}{N_1+N_3}(V_{22} - V_{11}) + \frac{1}{d}\frac{N_3}{N_1+N_3}(V_{44} - V_{33}), \tag{66}$$

where $V_{22}$ is the voltage recorded as received on receiver R2 when transmitter T2 is active, $V_{11}$ the voltage recorded as received on receiver R1 when transmitter T1 is active, $V_{44}$ the voltage recorded as received on receiver R4 when transmitter T4 is active, and $V_{33}$ the voltage recorded as received on receiver R3 when transmitter T3 is active. The conductivity profile may then be derived by inversion of $D_G$. Mutual balancing in this manner will increase the depth of investigation of the measurements, but a caveat is that it also increases the noise amplification factor.

Figure 6:
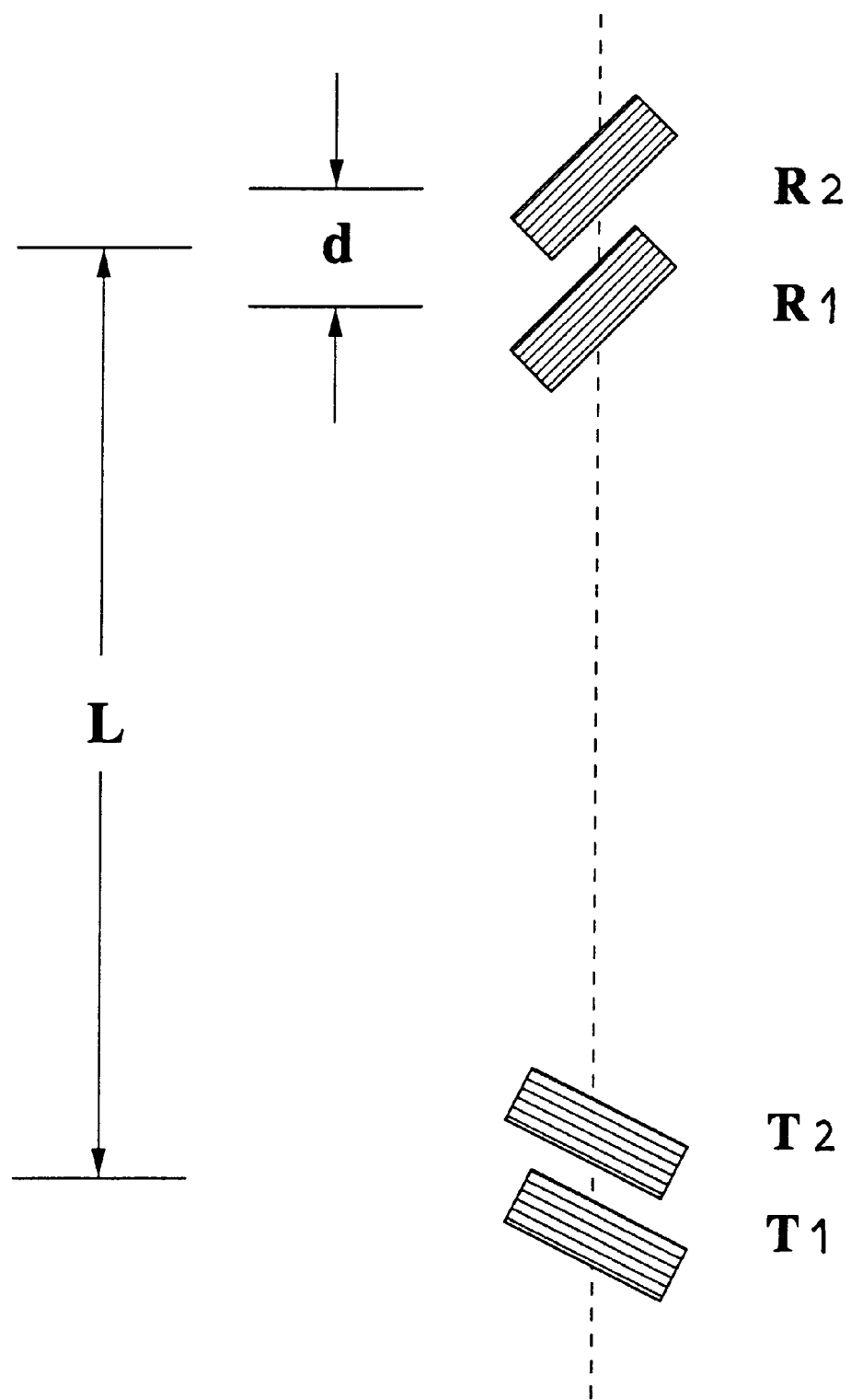
FIG. 6 is a schematic diagram of a tilted coil configuration in accord with the present invention.

FIG. 6 shows another coil configuration, similar to that of FIG. 4, where the coils' axes are tilted relative to the tool's longitudinal axis. This configuration provides directional information around the tool axis. A useful configuration is implemented by maintaining the transmitters T1, T2 at an equal tilt angle relative to the tool's longitudinal axis. The receivers R1, R2 are also preferably maintained at an equal tilt angle relative to the tool's longitudinal axis, but their tilt angle may differ from that of the transmitters T1, T2. The receivers R1, R2 and transmitters T1, T2 may also be tilted from the tool's longitudinal axis such that the magnetic dipole axes of the receivers are in a different plane from the magnetic dipole axes of the transmitters. An estimate of $D_G$ can be derived from equation (61) and the conductivity profile can then be obtained by inversion of $D_G$. In a sufficiently thick uniform layer, the conductivity estimate will be unaffected by adjacent layers.

Figure 7:
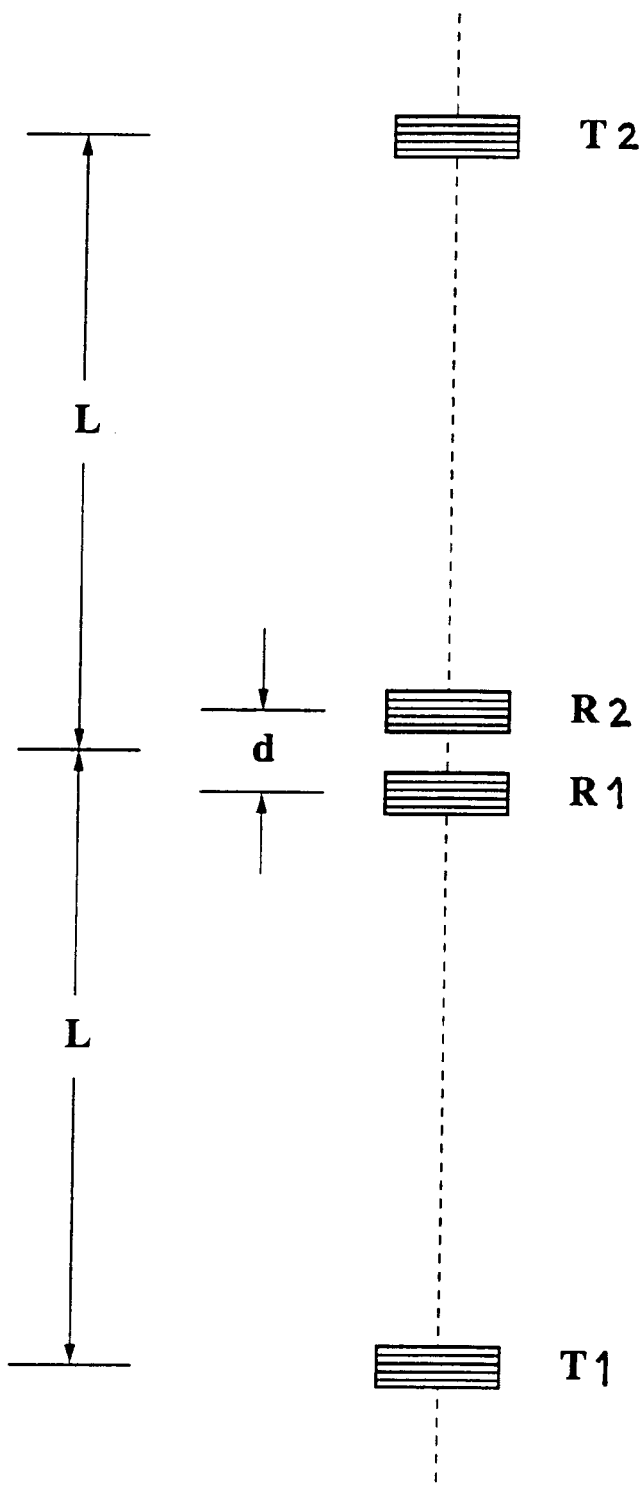
FIG. 7 is another schematic diagram of a coil configuration in accord with the present invention.

FIG. 7 shows an alternative coil configuration that can be used to implement the present invention. This configuration can be implemented from the tool designs A, B of FIG. 1. By alternately transmitting, measuring, and storing the data as discussed above, an estimate of $D_G$ is obtained from the formula $$D_G = \frac{1}{2d}(V_{21} - V_{11} + V_{12} - V_{22}), \tag{67}$$

where $V_{11}$ is the voltage data stored as received on receiver R1 when transmitter T1 is active, $V_{21}$ the voltage data stored as received on receiver R2 when transmitter T1 is active, $V_{12}$ the voltage data stored as received on receiver R1 when transmitter T2 is active, and $V_{22}$ the voltage data stored as received on receiver R2 when transmitter T2 is active. The conductivity profile can then be derived by inversion of $D_G$. Symmetrization of the measurements from the transmitters above and below the receivers, as in equation (67), is desirable to obtain improved accuracy.

Figure 8:
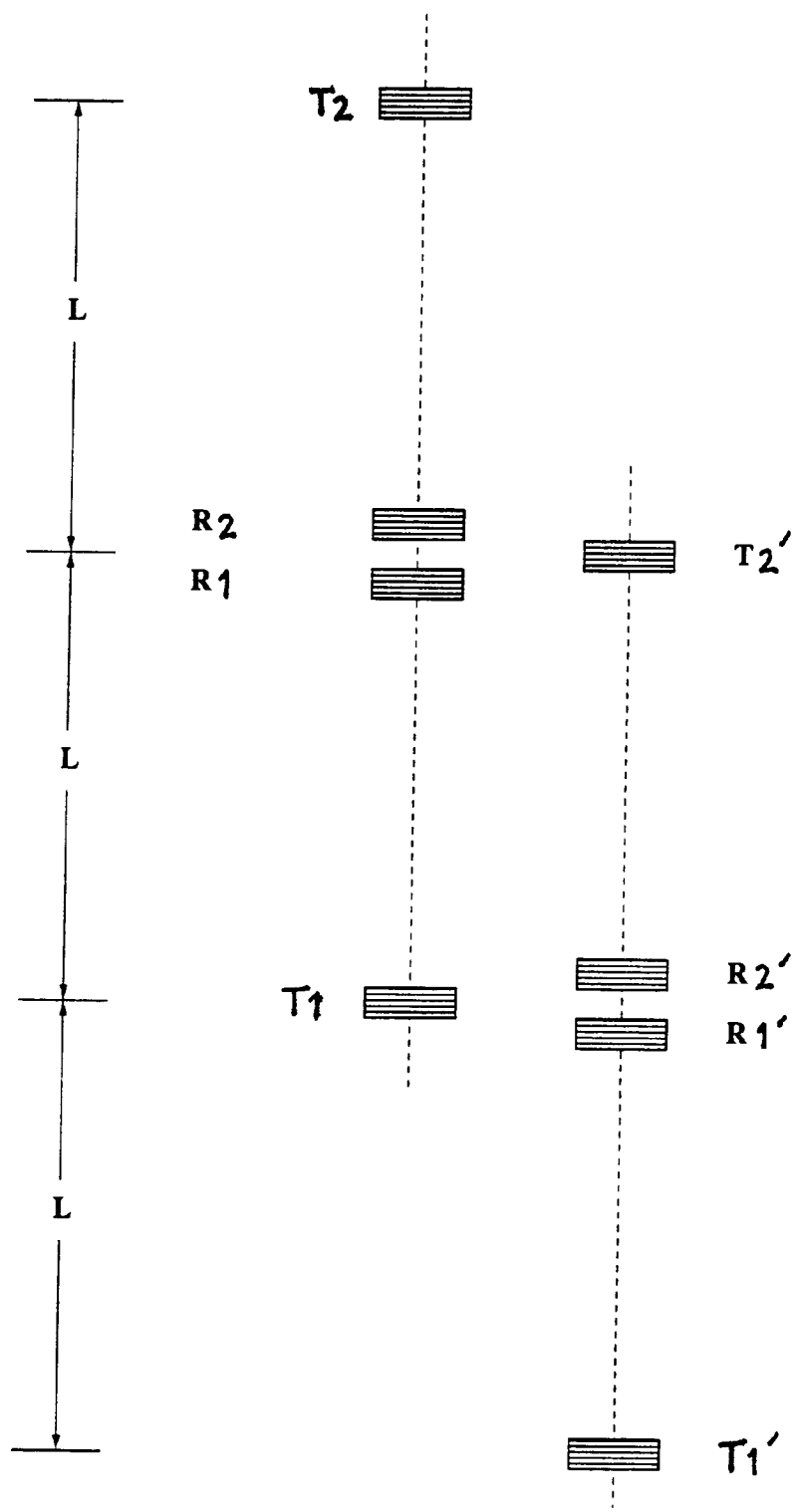
FIG. 8 is a schematic diagram of a measurement technique implemented with the configuration of FIG. 7 in accord with the present invention.

Turning to FIG. 8, a more accurate estimate of $D_G$ may be obtained with the coil configuration of FIG. 7 by combining and processing the measured data obtained from different tool positions as shown. In FIG. 8, the coil layout is shown displaced sideways for clarity. In operation, the coils are aligned along the borehole axis.

By alternately transmitting, measuring, and storing the data as discussed above, an estimate of $D_G$ is derived by $$D_G = \frac{1}{2d}(V_{21} - V_{11} + V_{1'2'} - V_{2'2'}), \tag{68}$$

where $V_{11}$ is the voltage recorded as received on receiver R1 when transmitter T1 is active and prior to tool movement, $V_{21}$ the voltage recorded as received on receiver R2 when transmitter T1 is active and prior to tool movement, $V_{1'2'}$ the voltage recorded as received on receiver R1 when transmitter T2 is active and after tool movement, and $V_{2'2'}$ the voltage recorded as received on receiver R2 when transmitter T2 is active and after tool movement. The conductivity profile can then be derived by inversion of $D_G$. As with the other embodiments of the invention, this configuration may be implemented in recorded-mode playback with stored data, or in real-time.

Figure 9:
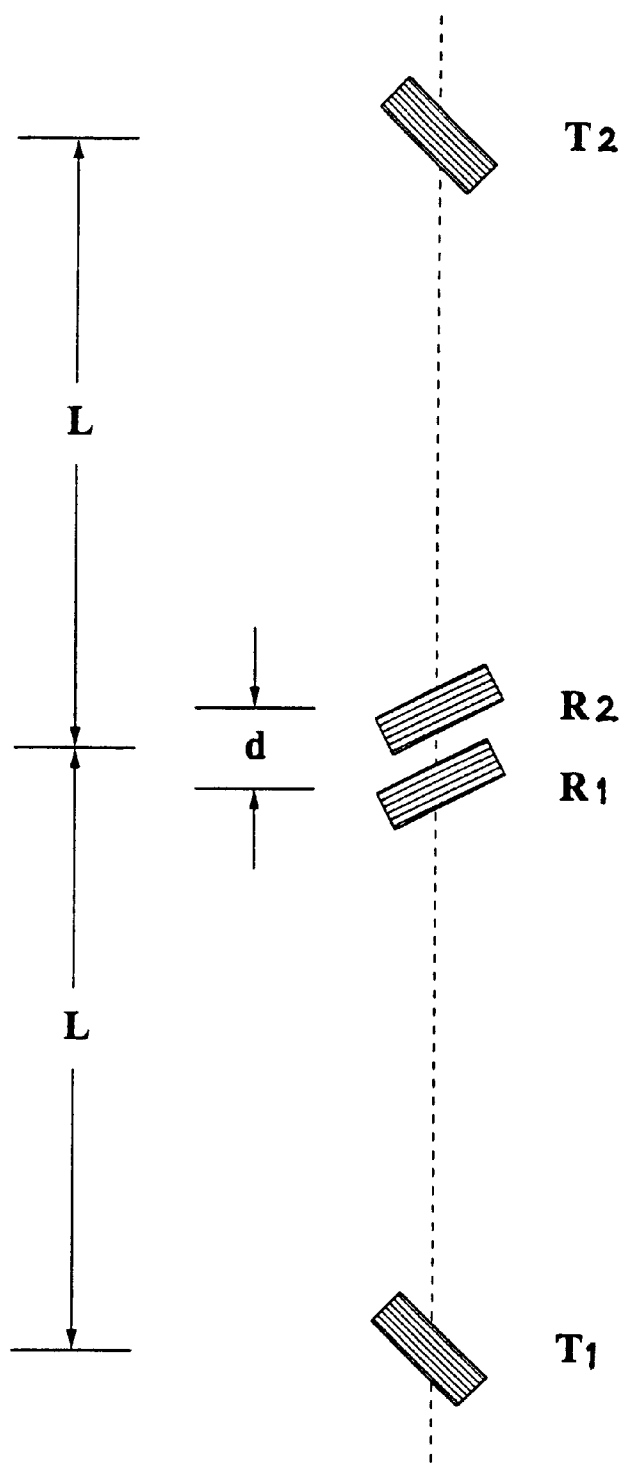
FIG. 9 is a schematic diagram of a crossed coil configuration in accord with the present invention.

FIG. 9 illustrates another coil configuration that may be used to implement the present invention. As discussed above, the disclosed techniques are applicable to logging tools incorporating transmitter and receiver coils having their axes tilted from the tool's longitudinal axis such that the axes of the transmitters T1, T2 cross the axes of the receivers R1, R2. The tilt angle of each receiver R1, R2 of the receiver pair is preferably maintained equal. The tilt angle of each transmitter T1, T2 of the transmitter pair is also preferably maintained equal. However, the tilt angles of the transmitter pair may differ from the tilt angles of the receiver pair. The magnetic moments or magnetic dipole axes of the receivers R1, R2 may also be tilted in a different plane relative to the magnetic moments of the transmitters T1, T2. This configuration provides directional measurement from a common tool axis. An estimate of $D_G$ can be obtained by using equation (67) and the conductivity profile can be generated by inversion of $D_G$.

Figure 10:
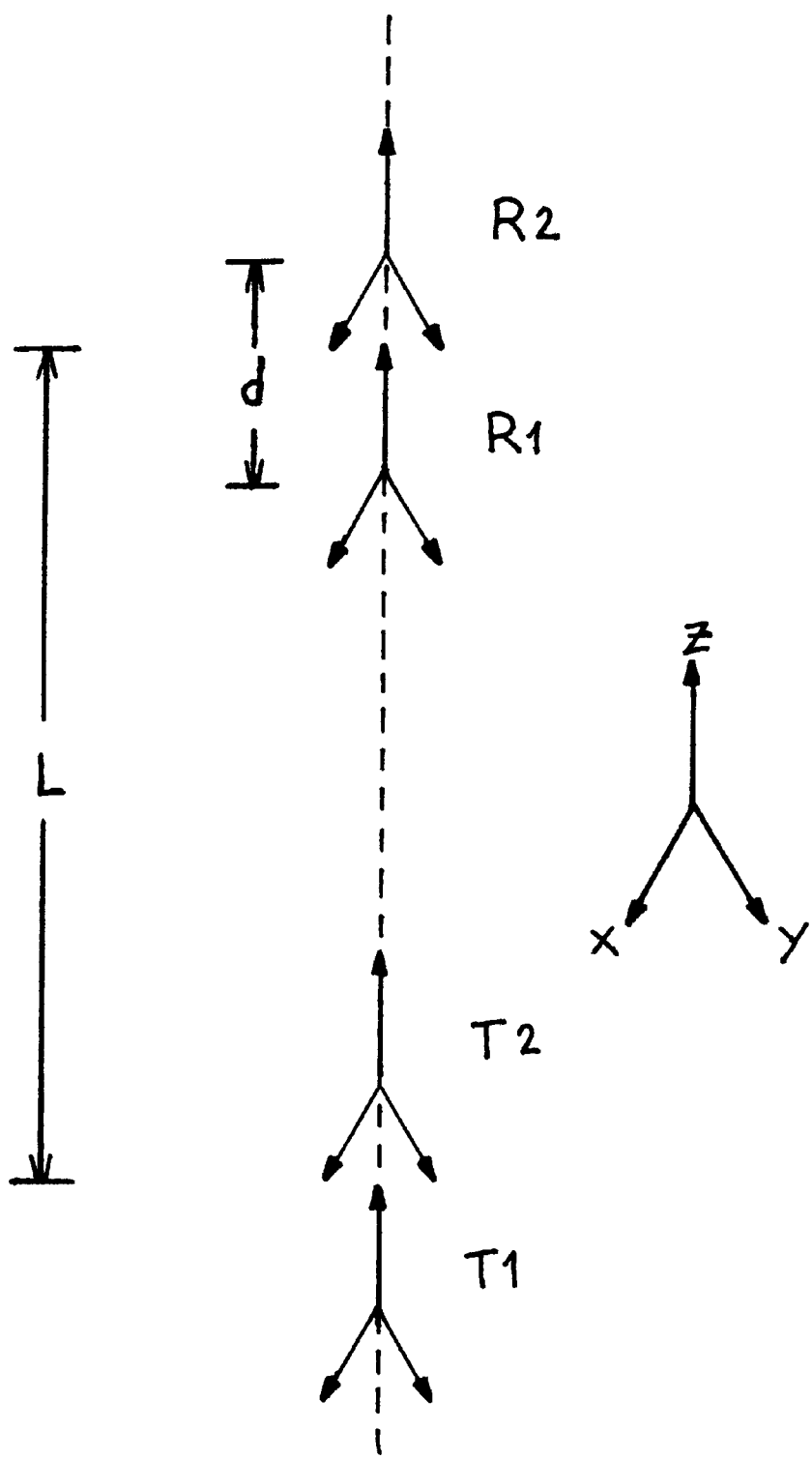
FIG. 10 is a schematic diagram of a triaxial coil configuration in accord with the present invention.

Turning to FIG. 10, another coil configuration for implementation of the present invention is shown. The disclosed techniques are also applicable to logging tools incorporating triaxial transmitters T1, T2 and/or triaxial receivers R1, R2. As known in the art, a triaxial transmitter or receiver coil configuration has at least three coils with magnetic moments that are not co-planar. The magnetic moments of these triaxial coil configurations may be aligned at arbitrary angles, not necessarily at ninety degrees to each other. The respective magnetic moments of each triaxial receiver R1, R2 are preferably parallel. The respective magnetic moments of each triaxial transmitter T1, T2 are also preferably parallel. However, the magnetic moments of the triaxial transmitter pair need not be parallel from the magnetic moments of the triaxial receiver pair. Measurements with triaxial transmitters and receivers provide directional information around the tool axis. With triaxial transmitters and receivers, one can measure the voltage differences $D_G(i, j)$ between each of the individual transmitter pairs comprising the triaxial transmitter pair and each of the individual receiver pairs comprising the triaxial receiver pair. In an anisotropic formation, these measurements can also provide information about the dip, strike, and anisotropy of the formation. Estimates of $D_G$ may be obtained as discussed above and the conductivity profile generated by inversion of $D_G$.

Figure 11:
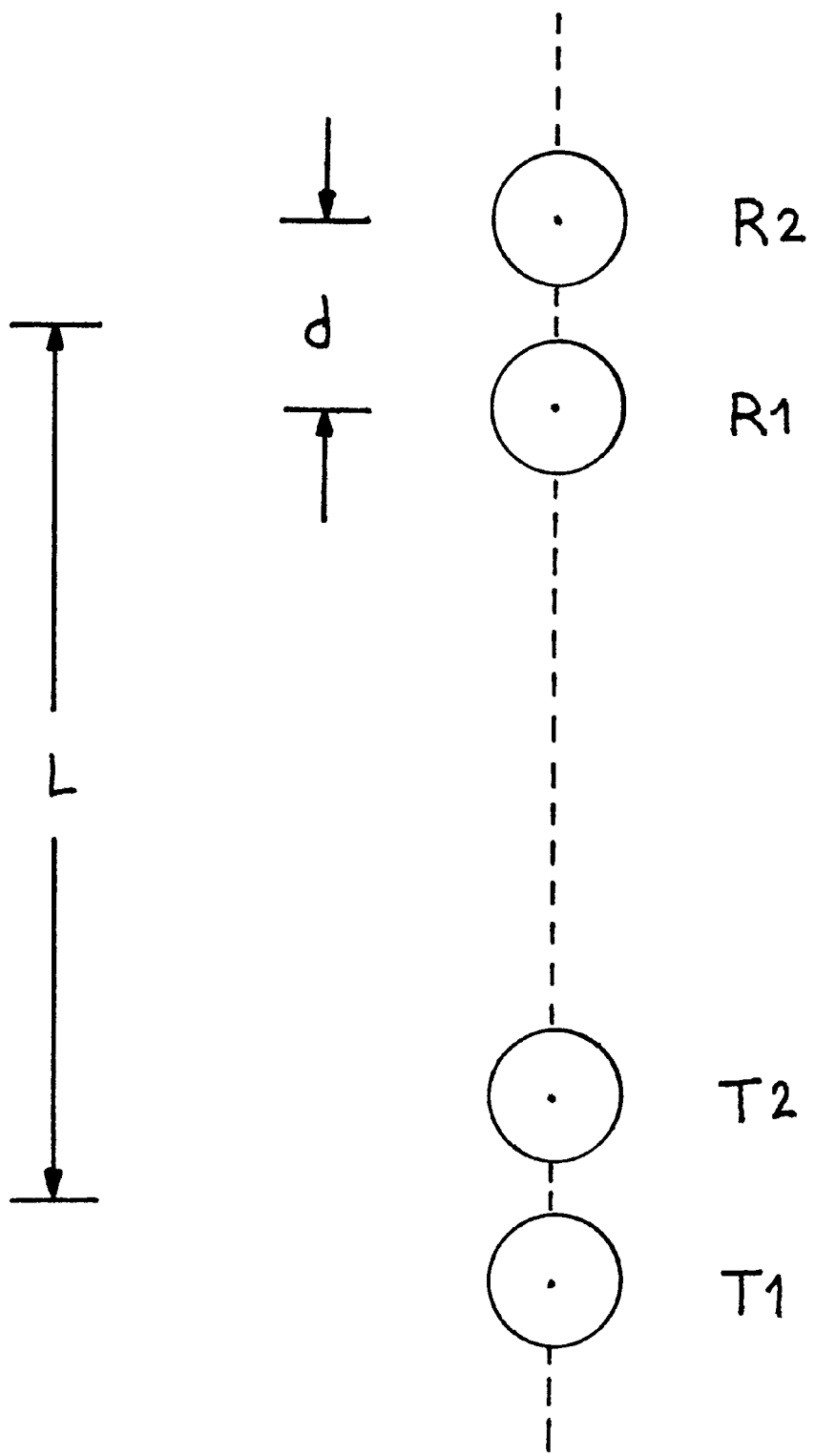
FIG. 11 is a schematic diagram of a transverse coil configuration in accord with the present invention.

FIG. 11 shows yet another coil configuration for implementation of the present invention. This configuration includes transmitters T1, T2 and receivers R1, R2 having their axes transversely disposed, i.e. perpendicular to the tool's longitudinal axis. The magnetic moments of each receiver R1, R2 are preferably maintained in the same plane. The magnetic moments of each transmitter T1, T2 are also preferably maintained in the same plane. However, the magnetic moments of the transmitter pair may be in a different plane from the magnetic moments of the receiver pair. Estimates of $D_G$ may be obtained as discussed above and the conductivity profile generated by inversion of $D_G$. It will be appreciated that the techniques of the present invention may be implemented with a tool comprising more transversely disposed transmitters Tn and/or receivers Rn than shown in FIG. 11.

Figure 12:
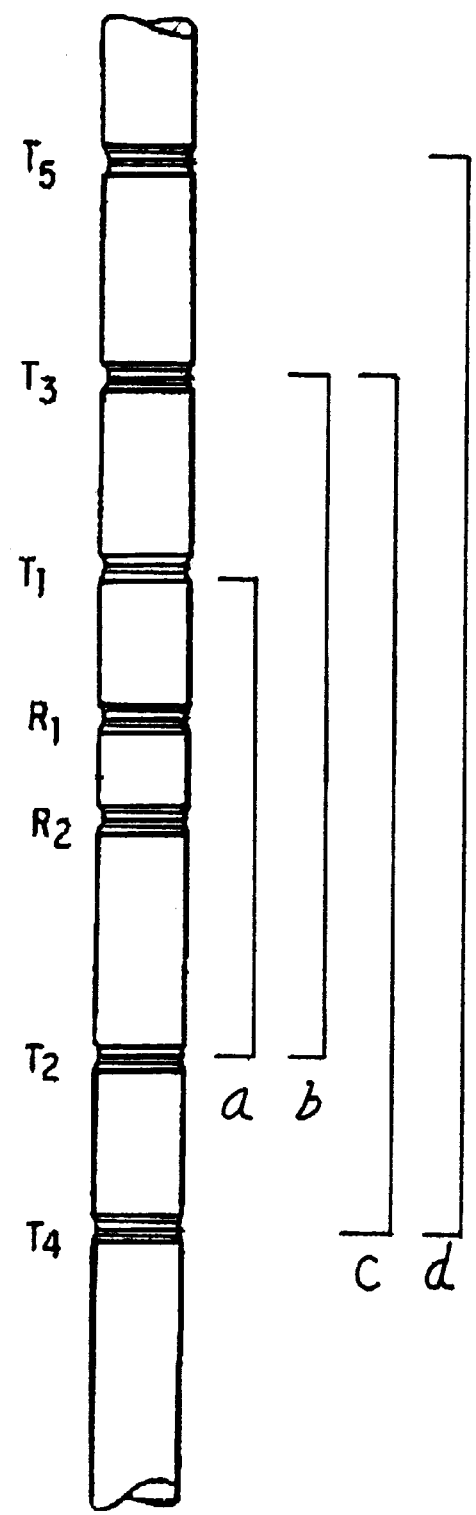
FIG. 12 illustrates a measurement scheme, using a tool design of FIG. 1, in accord with the present invention.

FIG. 12 illustrates a measurement scheme, in accord with the present invention, that may be implemented with the tool design A of FIG. 1. By selecting one transmitter Tn positioned above the receiver pair R1, R2, and one transmitter Tm positioned below the receiver pair R1, R2, multiple depths of investigation may be obtained. For each depth of investigation, two transmitters Tn, Tm are selected as shown in FIG. 11. Voltage data is obtained for each transmitter pair (labeled a, b, c, d) by alternately transmitting, measuring, and storing the voltages as discussed above. Repeated application of equation (67) will produce four symmetrized samples of $D_G$ with different depths of investigation. The conductivity profile can then be derived by inversion of each $D_G$ estimate. It will be appreciated that this measurement scheme may be implemented with a tool comprising more or fewer transmitters Tn and/or receivers Rn than shown in FIG. 12.

Figure 13:
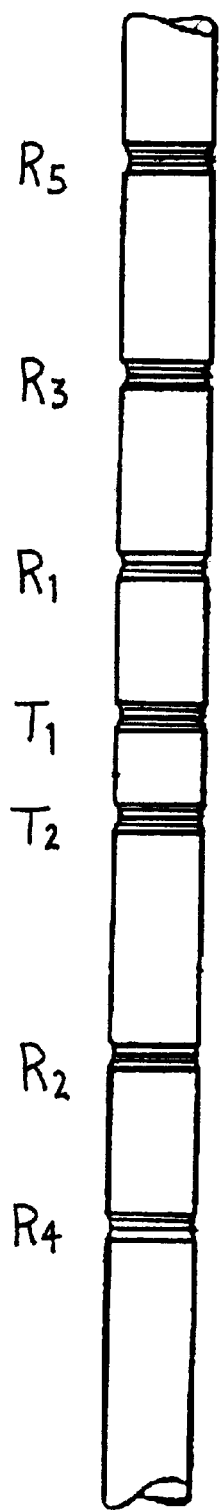
FIG. 13 shows a coil configuration obtained from a reciprocal implementation of a tool design of FIG. 1 in accord with the present invention.

FIG. 13 shows another coil configuration that can be obtained from a reciprocal implementation of the tool design A of FIGS. 1 and 12. This implementation is derived by interchanging the transmitters Tn and receivers Rn. The configuration shown in FIG. 13 will provide the same measurements producing the same information as the configuration in FIG. 12 because of EM reciprocity. The configuration of FIG. 13, and other configurations that may be derived from the disclosed embodiments by interchanging the roles of transmitters and receivers, may be implemented with the disclosed techniques to produce the same information under the principle of EM reciprocity.

Figure 14:
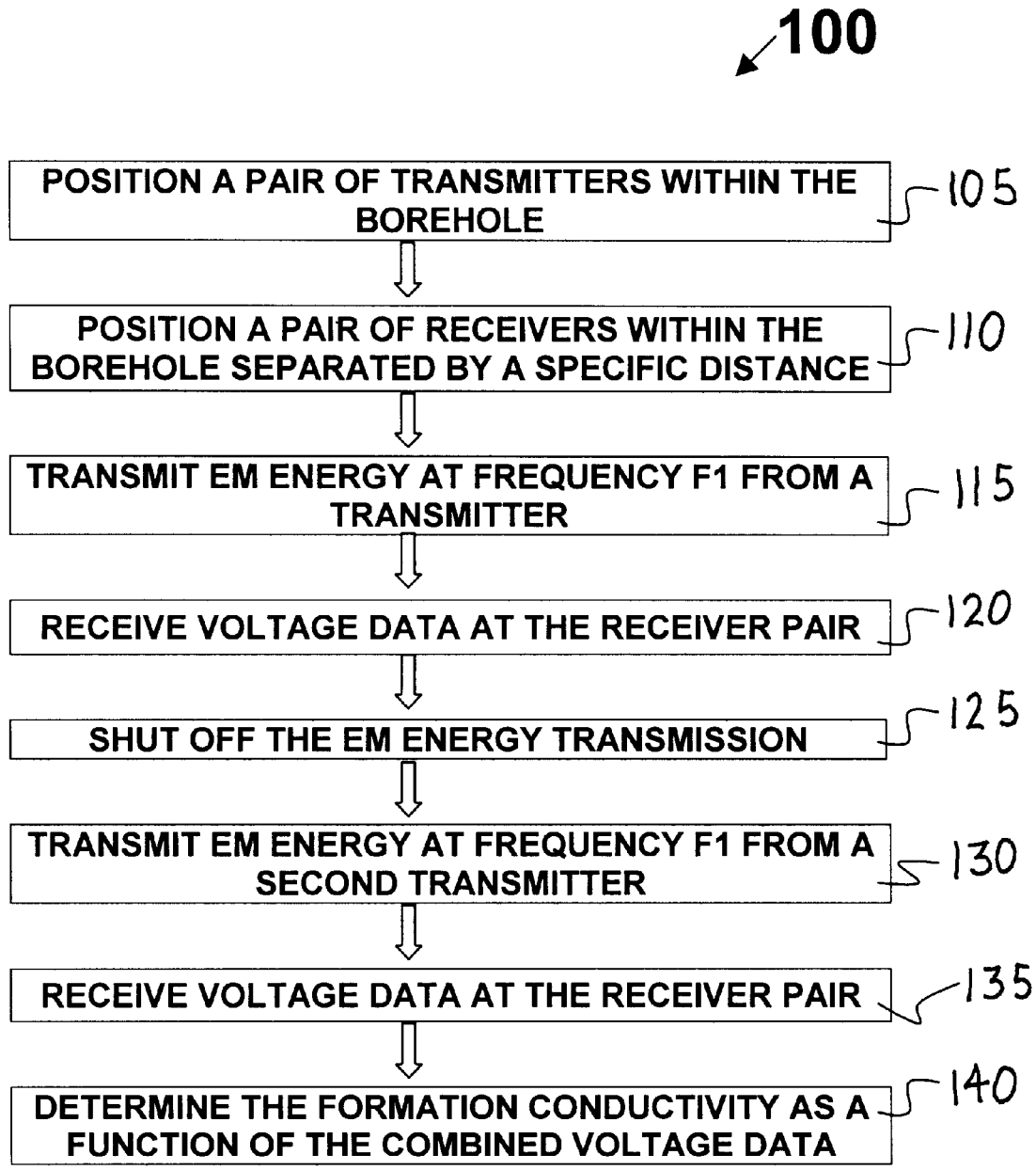
FIG. 14 illustrates a flow diagram of a method for implementation of the present invention.

FIG. 14 illustrates a flow diagram of a method 100 for evaluating the resistivity of earth formations surrounding a borehole in accord with the present invention. The method comprises positioning a pair of transmitters T1, T2 within the borehole 105; positioning a pair of receivers R1, R2, separated from one another by a distance d, within the borehole 110; transmitting EM energy of frequency f1 from a first transmitter of the transmitter pair 115; receiving voltage data associated with the transmitted energy at the receiver pair 120; shutting off the transmission of EM energy from the first transmitter 125; transmitting EM energy of frequency f1 from a second transmitter of the transmitter pair 130; receiving voltage data associated with the transmitted energy at the receiver pair 135; and calculating the following expression to determine a formation conductivity profile 140:

$$D_G = \frac{1}{d}(V_{21} - V_{12}). \tag{69}$$

Figure 15:
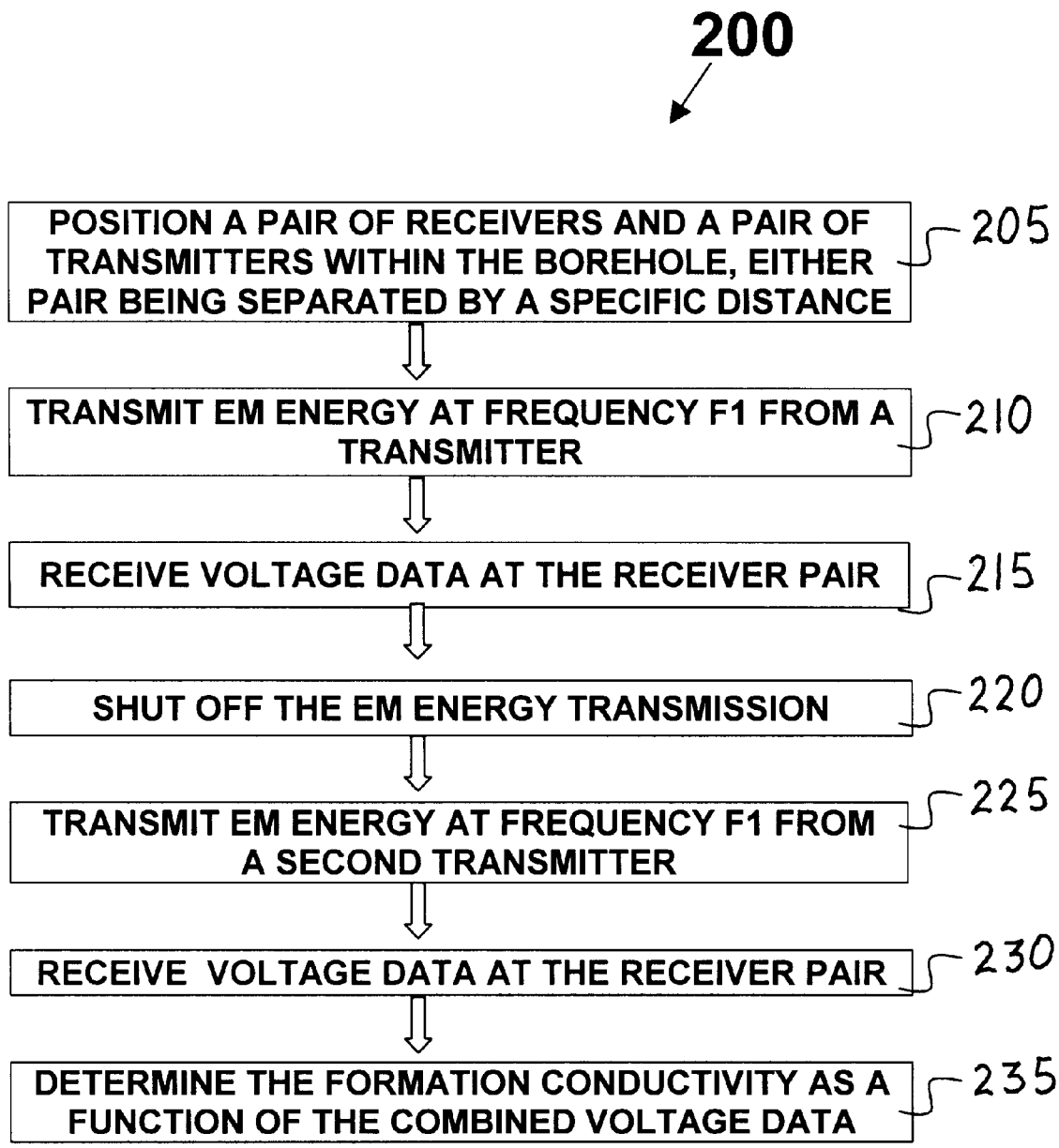
FIG. 15 illustrates a flow diagram of a method for implementation of the present invention.

FIG. 15 illustrates a flow diagram of another method 200 for evaluating the resistivity of earth formations surrounding a borehole in accord with the present invention. The method comprises positioning a pair of receivers R1, R2 and a pair of transmitters T1, T2 within the borehole, either both receivers of the receiver pair or both transmitters of the transmitter pair being separated from one another by a distance d 205; transmitting EM energy of frequency f1 from a first transmitter of the transmitter pair 210; receiving voltage data associated with the transmitted energy at the receiver pair 215; shutting off the transmission of EM energy from the first transmitter 220; transmitting EM energy of frequency f1 from a second transmitter of the transmitter pair 225; receiving voltage data associated with the transmitted energy at the receiver pair 230; and calculating the following expression to determine a formation conductivity profile 235:

$$D_G = \frac{1}{2d}(V_{21} - V_{11} + V_{12} - V_{22}). \tag{70}$$

4.5 Program Storage Device

It will be apparent to those of ordinary skill having the benefit of this disclosure that the present invention may be implemented by programming one or more suitable general-purpose computers having appropriate hardware. The programming may be accomplished through the use of one or more program storage devices readable by the computer processor and encoding one or more programs of instructions executable by the computer for performing the operations described above. The program storage device may take the form of, e.g., one or more floppy disks; a CD ROM or other optical disk; a magnetic tape; a read-only memory chip (ROM); and other forms of the kind well-known in the art or subsequently developed. The program of instructions may be "object code," i.e., in binary form that is executable more-or-less directly by the computer; in "source code" that requires compilation or interpretation before execution; or in some intermediate form such as partially compiled code. The precise forms of the program storage device and of the encoding of instructions are immaterial here.

4.6 Logging System

Figure 16:
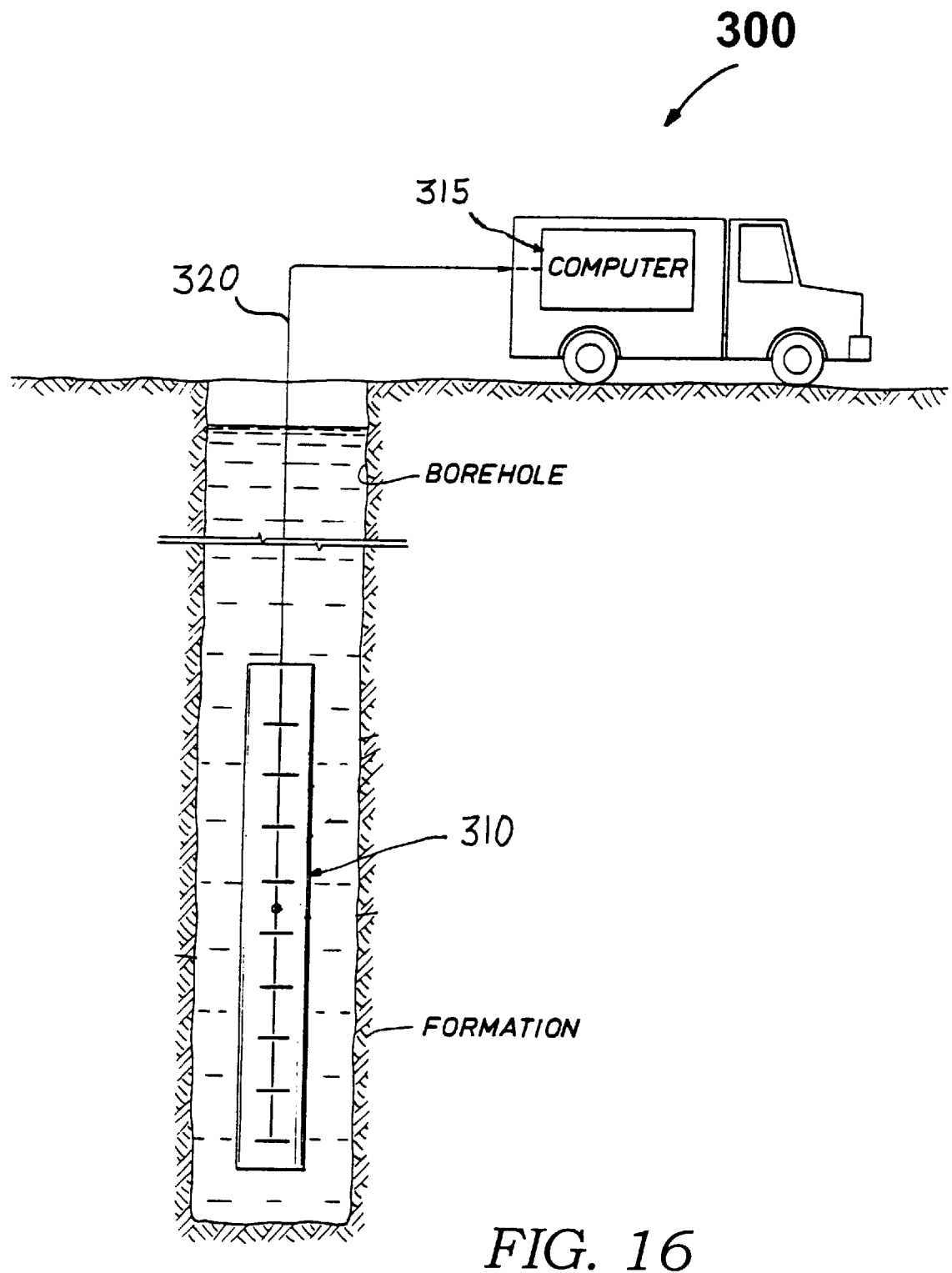
FIG. 16 shows a logging system including a well tool and a computer apparatus in accord with the present invention.

The present invention can be implemented in a logging system 300 with a well tool 310 adapted to be moveable through a borehole and an apparatus 315 coupled to the tool 310 as shown in FIG. 16. Certain conventional details are omitted in FIG. 16 for clarity of illustration. The apparatus 315 comprises a surface computer (such as the general-purpose computer and program storage device described above) coupled to the well tool 310 by a wireline cable 320 or linked to the tool string's surface instrumentation as known in the art. The tool 310 may be any propagation or induction tool that embodies the disclosed coil configurations and conditions. The system may also be implemented in a wireline or LWD operation.

The formation resistivity can be determined in real-time by sending the voltage data to the surface as they are acquired, or it can be determined from a recorded-mode by recording the data on a suitable recordable medium. As known in the art, the voltage data are transmitted from the tool 310 to the surface computer 315 by electronics (not shown) housed in the tool 310. The voltage data may be sent to the surface computer 315 along the wireline cable 320 or by MWD telemetry as known in the art. It will be understood that alternative means can be employed for communicating the acquired data to the surface as the precise form of communication is immaterial to the implementation of the disclosed techniques.

Once received by the surface computer 315, the data can be recorded, processed, or computed as desired by the user to generate a formation conductivity profile. The profile can then be recorded on a suitable output record medium. Alternatively, some or all of the processing can be performed downhole and the data can be recorded uphole, downhole, or both. It will be understood that the present invention can be implemented in conjunction with any suitable technique for keeping track of the tool 310 depth within a borehole.

4.7 Inversion Examples

Figure 17:
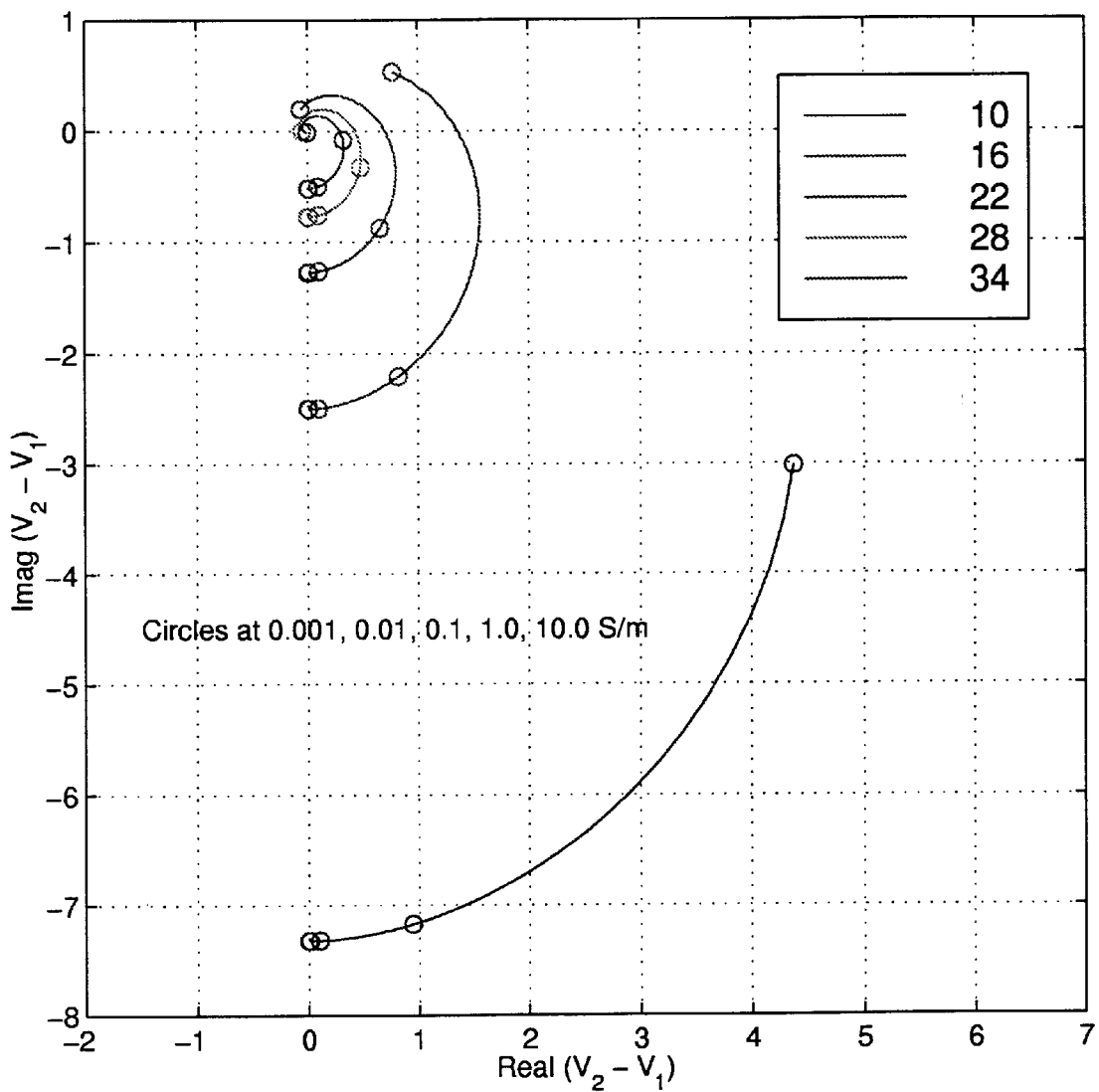
FIG. 17 illustrates graphically the trajectory of a voltage differential in the complex plane.
Figure 18:
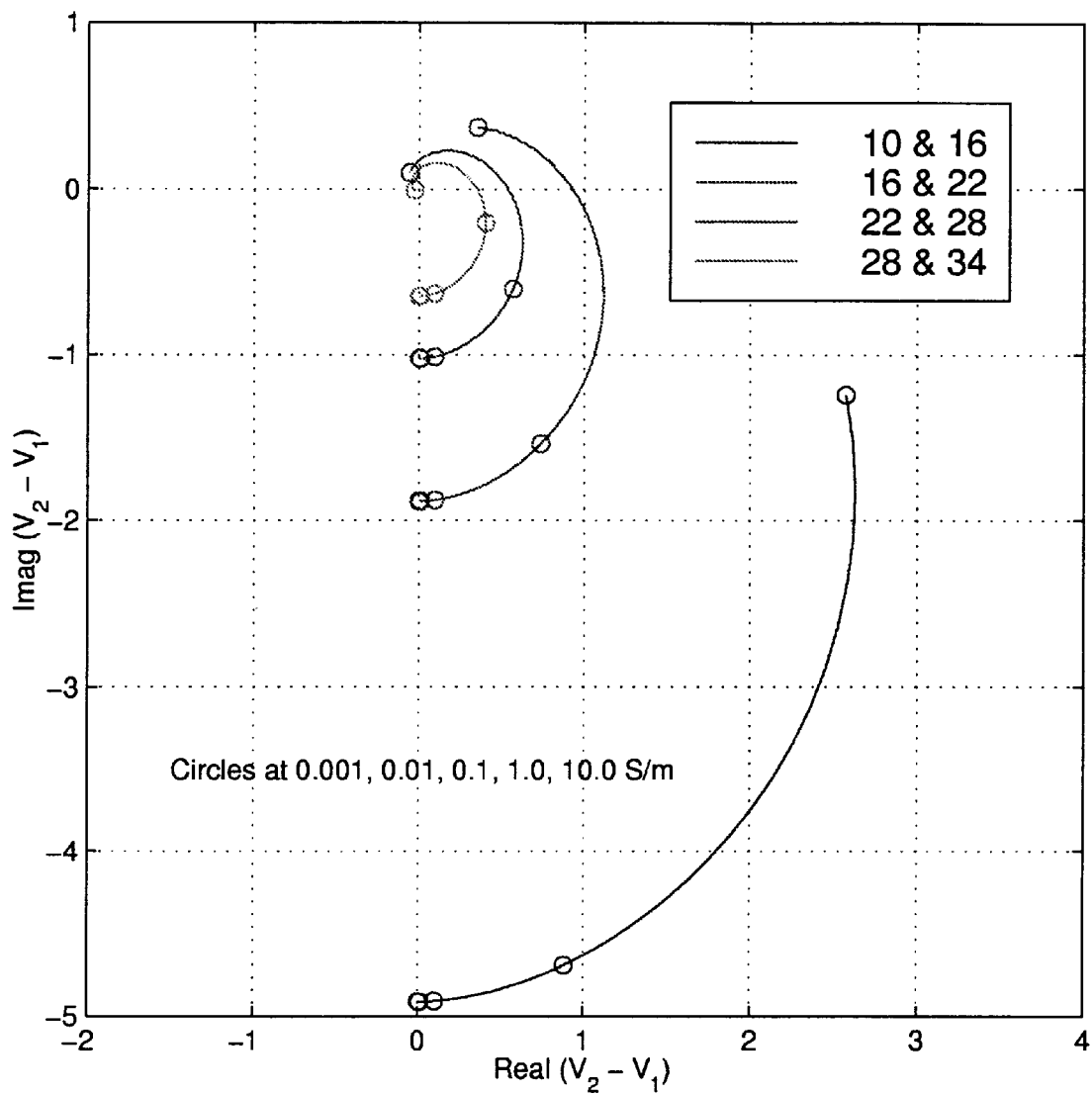
FIG. 18 illustrates graphically the trajectory of the voltage differential of FIG. 17 after being processed in accord with the present invention.
Figure 19:
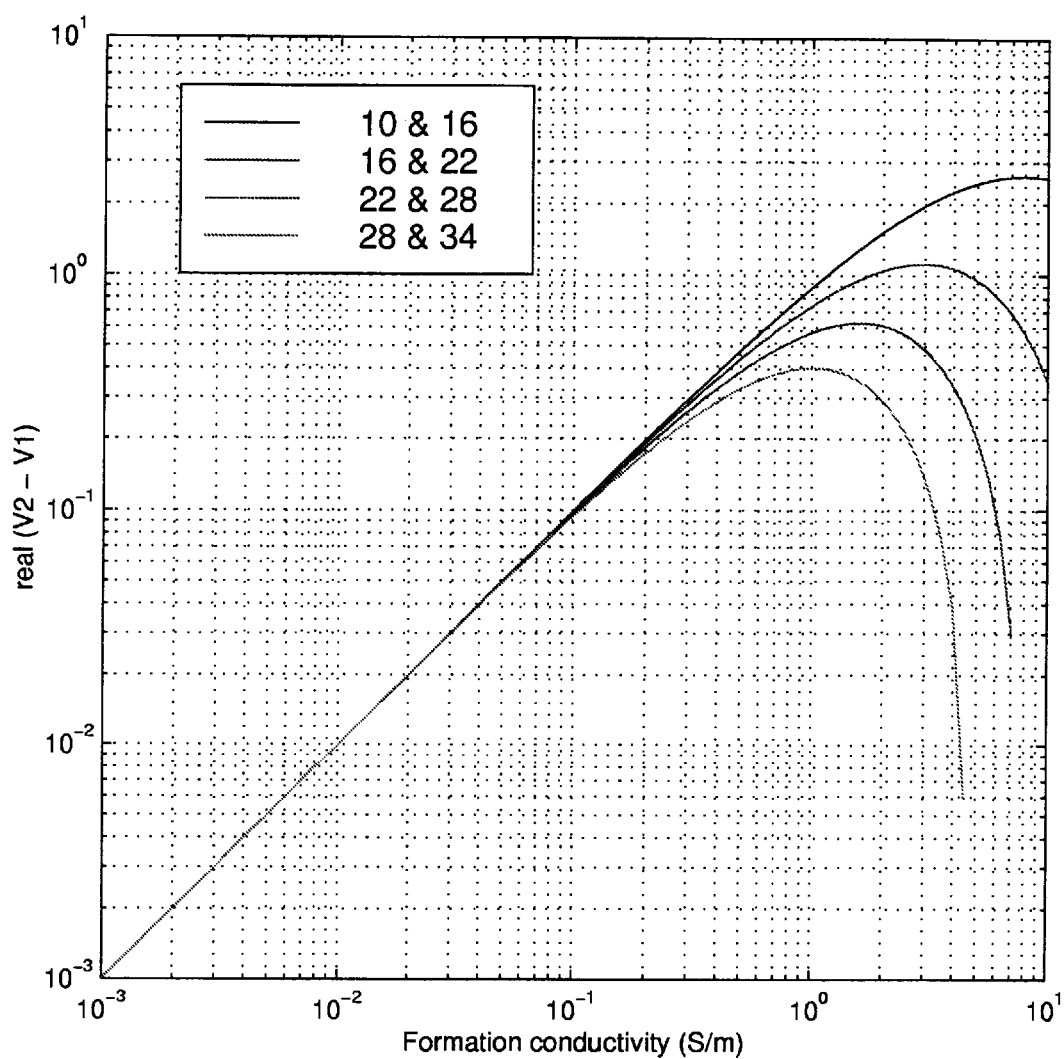
FIG. 19 illustrates the real part of the voltage differential of FIG. 18 plotted against formation conductivity.
Figure 20:
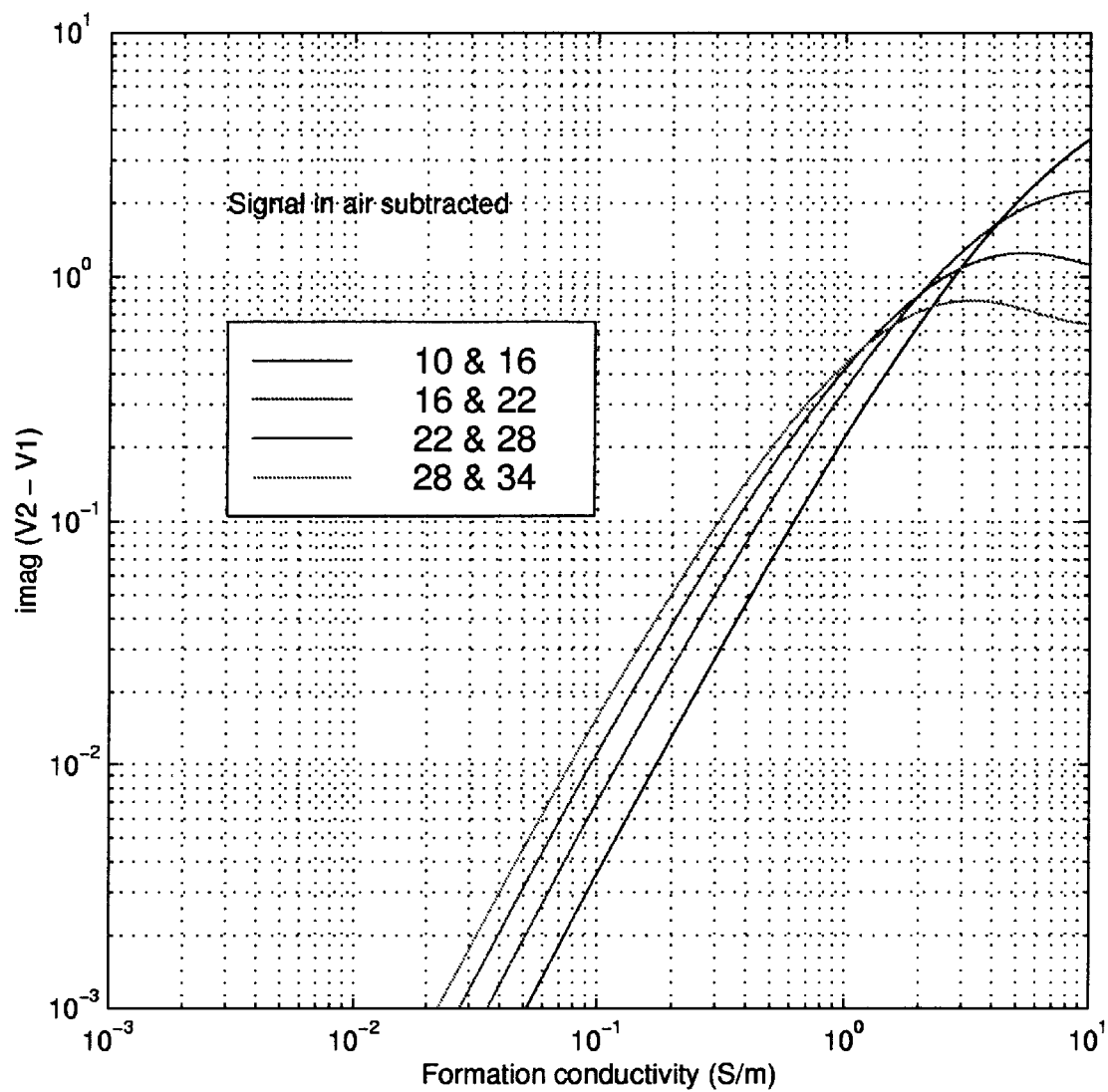
FIG. 20 illustrates the imaginary part of the voltage differential of FIG. 18 plotted against formation conductivity.

In this section, results obtained from computations of test data and actual data are presented. FIG. 17 shows the simulated trajectory of $\Delta V = V_2 - V_1$ in the complex plane for the five transmitters Tn (n=1,2,3,4,5) of the tool design A of FIG. 1, the tool operating at 2 MHz. The five transmitters Tn of the tool design A having axial positions $h_r$=−10, 16, −22, 28, and −34 inches. The real and imaginary parts of $\Delta V$ are expressed in apparent conductivity units. The formation conductivity varies between 0.001 and 10 S/m. The trajectories, after symmetrizing transmitter Tn pairs, are plotted in FIG. 18. The real and imaginary parts of $\Delta V$ are respectively plotted against formation conductivity in FIGS. 19 and 20. The formation conductivity can be estimated by a simple lookup of the curves of FIGS. 19 and 20 as discussed above. A more robust inversion may also be obtained from the measured data for $\Delta V$ by performing a least squares minimizing technique.

Figure 21:
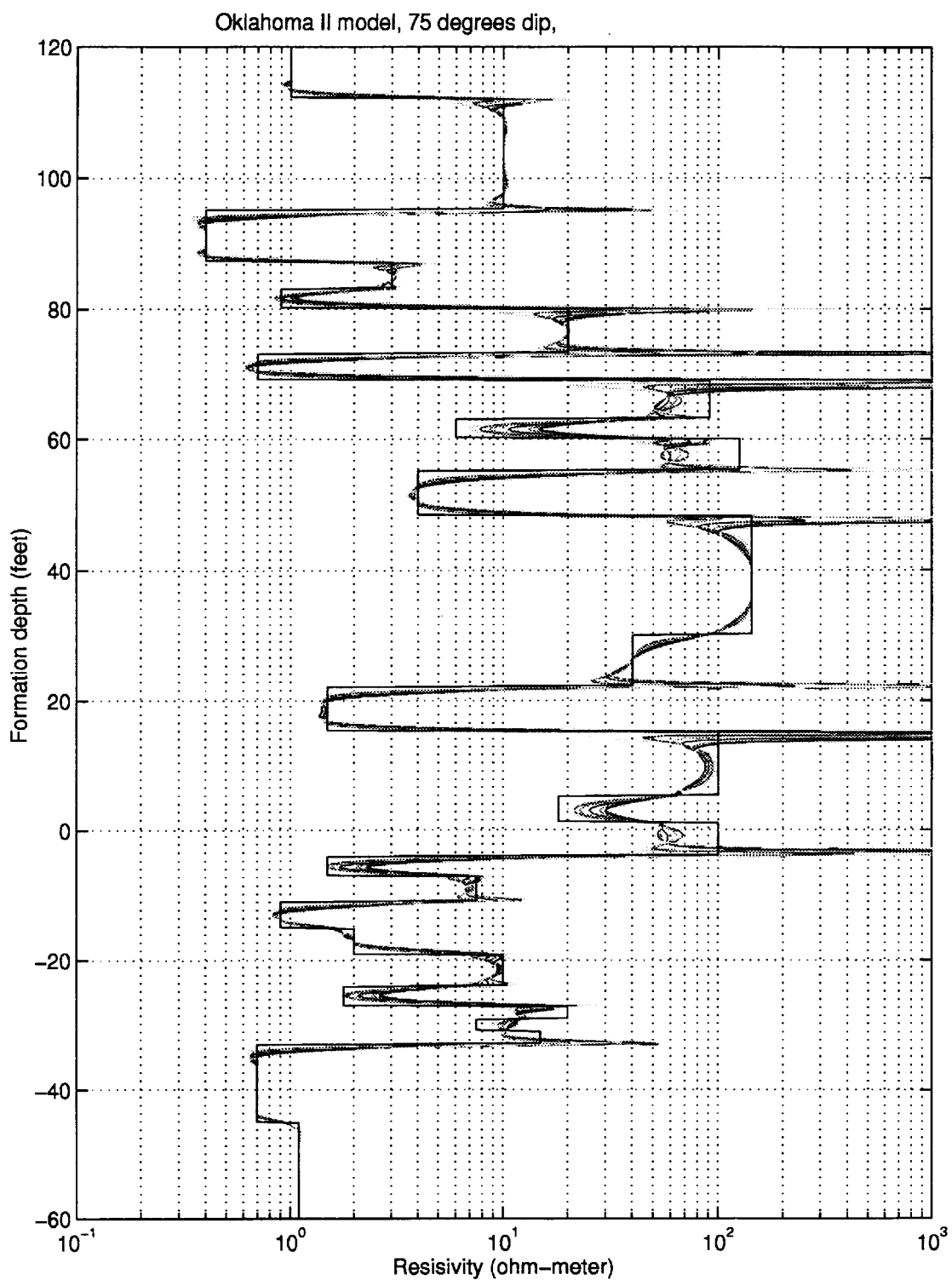
FIG. 21 is a conventionally processed resistivity log derived from the phase difference of a computed tool response.
Figure 22:
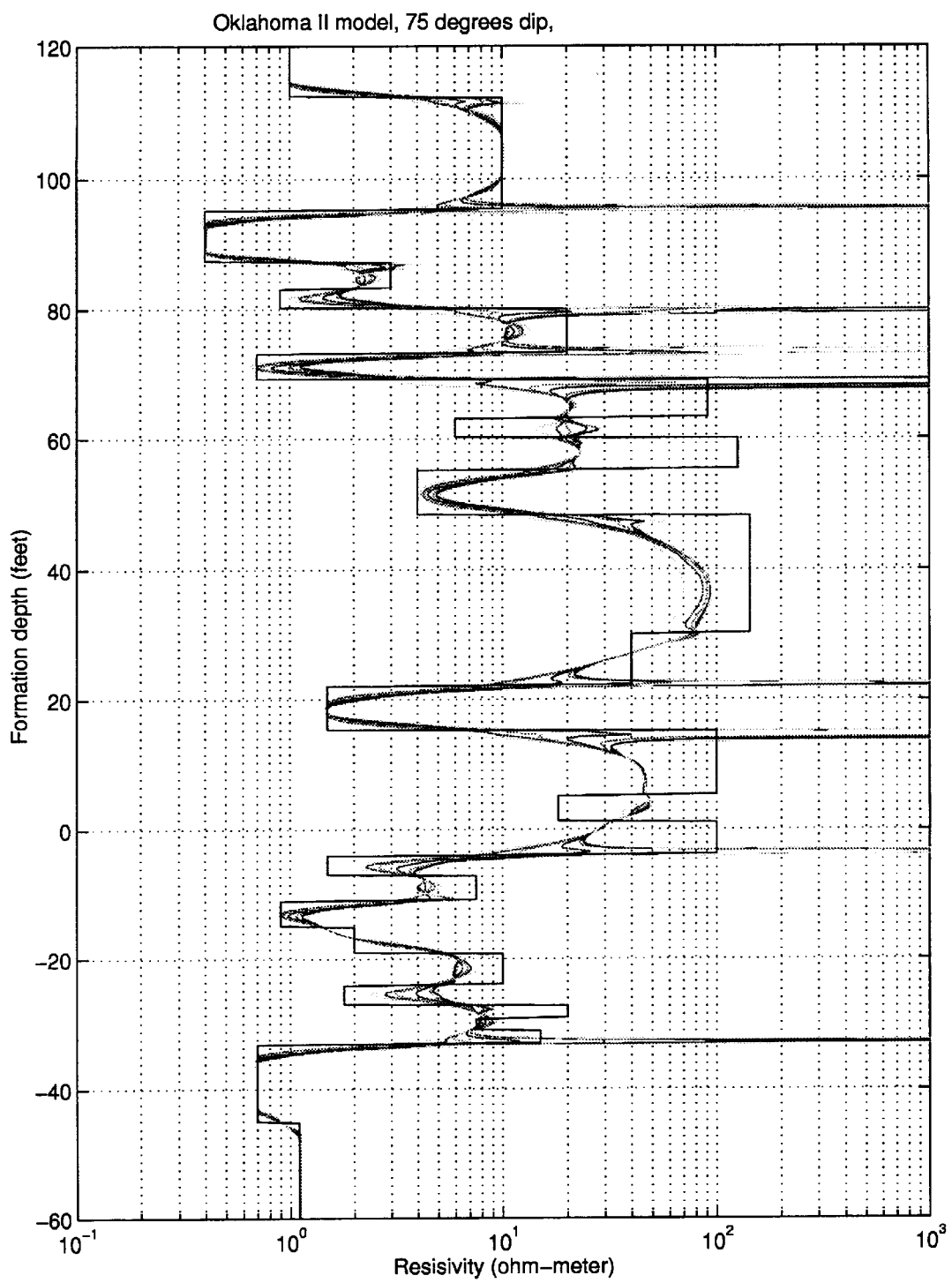
FIG. 22 is a conventionally processed resistivity log derived from the attenuation decrement of the computed response of FIG. 21.

FIGS. 21 and 22 show resistivity logs produced with conventional processing applied to a computed response of the tool design A of FIG. 1. The Oklahoma II formation was used (a frequently used test problem to evaluate resistivity processing) in the computation. The dip angle is 75 degrees and the coils are idealized as point magnetic dipoles. FIG. 21 shows the resistivity logs derived from the phase difference, FIG. 22 the resistivity logs obtained from the attenuation decrement. TM horns are visible at the high-contrast layer boundaries. The log of FIG. 22 also shows a strong shoulder effect in the resistive layers.

Figure 23:
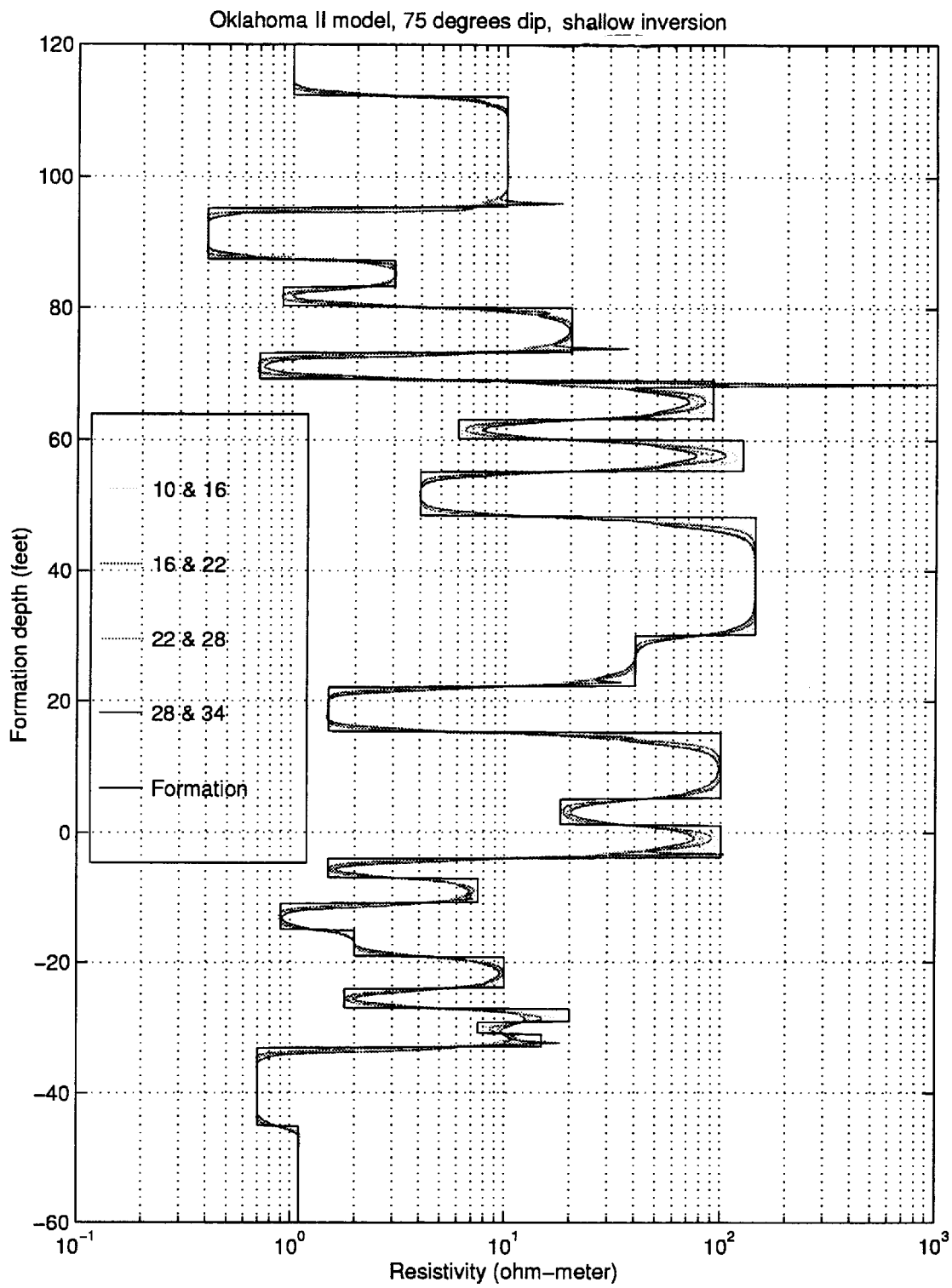
FIG. 23 shows a resistivity log of the model formation of FIG. 21 after application of the techniques of the present invention.
Figure 24:
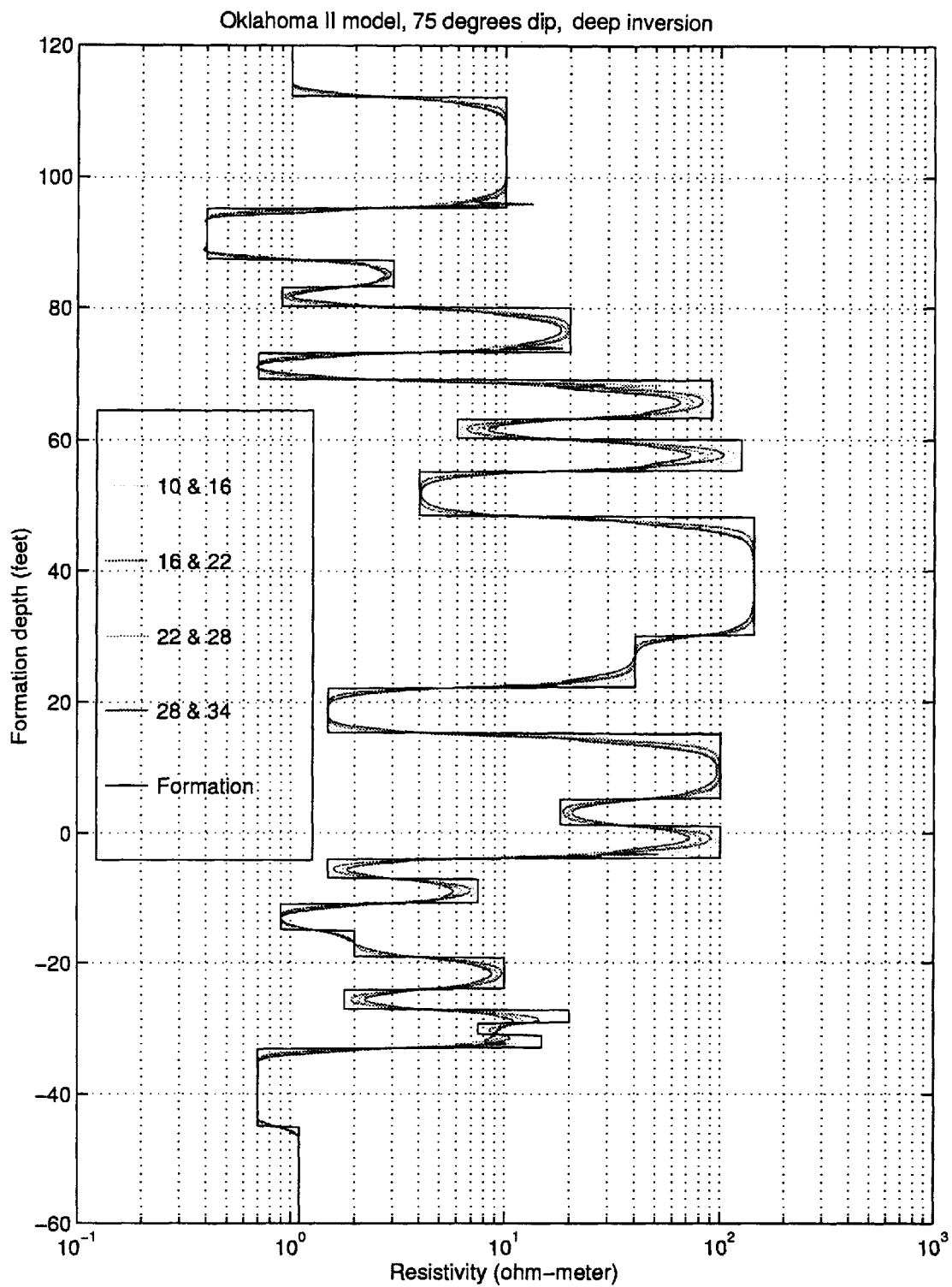
FIG. 24 shows a resistivity log of the model formation of FIG. 22 after application of the techniques of the present invention.

FIGS. 23 and 24 show the results obtained with the corresponding model formations as FIGS. 21 and 22 after applying the techniques of the present invention. FIG. 23 showing the shallow resistivity inversion and FIG. 24 the deep inversion. Performing a least squares fit of the data using equation (63), with different weights w1, produced the profiles of FIGS. 23 and 24. Accurate resistivity values are obtained in the resistive layers. With the exception of a few spikes in the shallow log of FIG. 23, the TM horns have been practically eliminated. The shallow and deep profiles are practically identical, indicating the absence of invasion.

Figure 25:
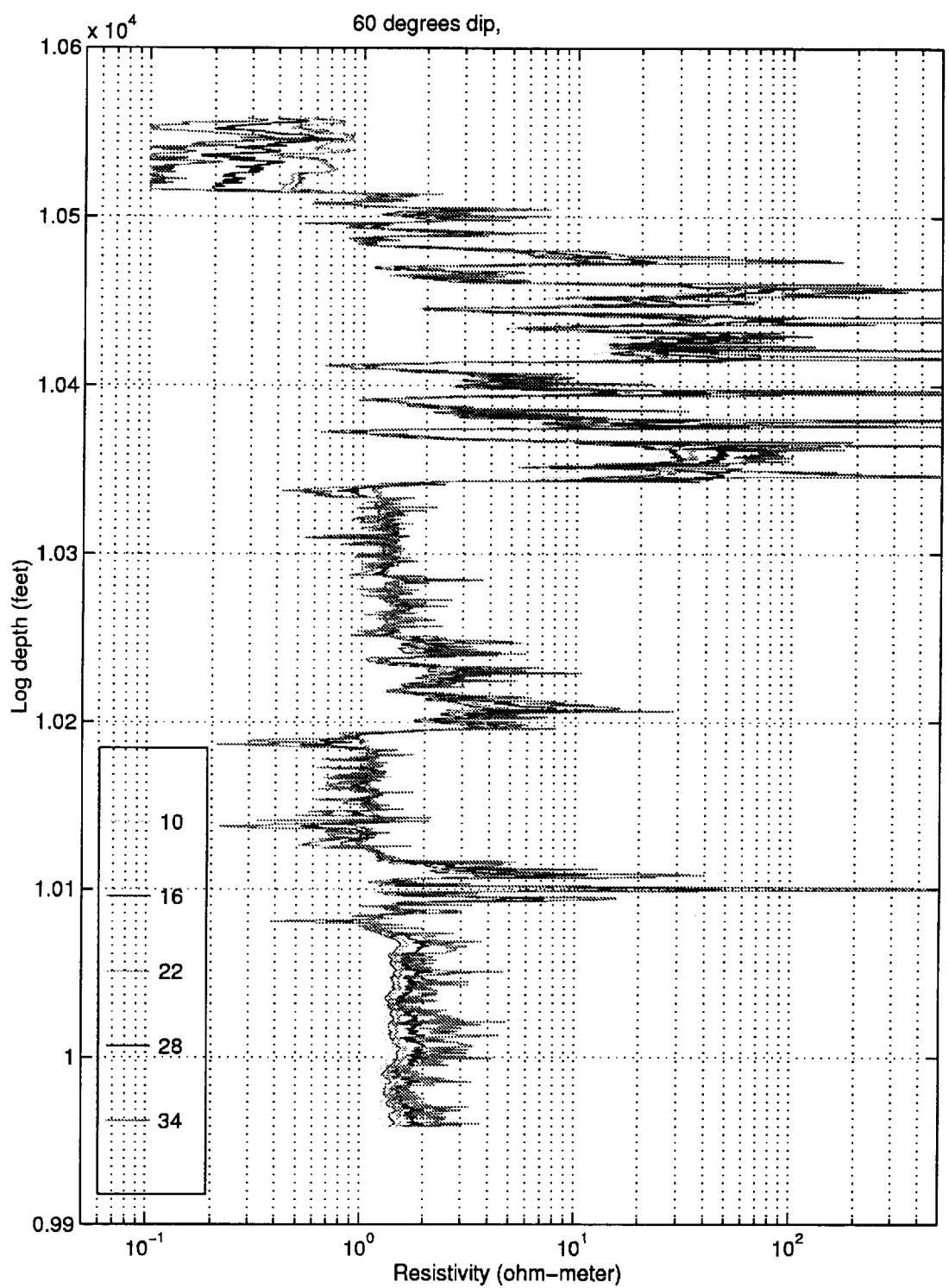
FIG. 25 is a conventionally processed resistivity log derived from the phase difference of a field log.
Figure 26:
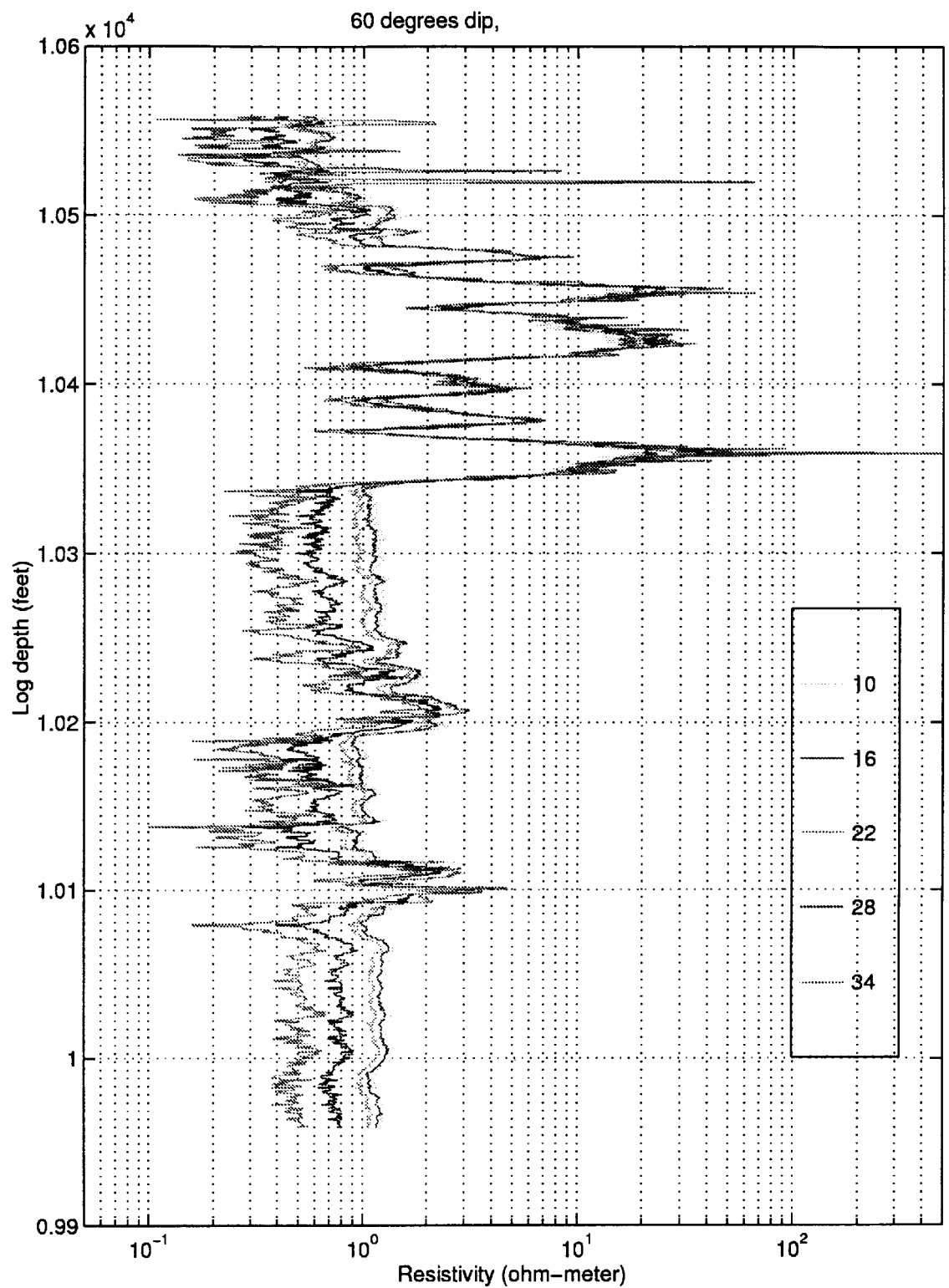
FIG. 26 is a conventionally processed resistivity log derived from the attenuation decrement of the field log of FIG. 25.

FIGS. 25 and 26 show resistivity logs produced with conventional processing applied to a field log. FIG. 25 shows the resistivity logs derived from the phase difference, FIG. 26 the resistivity logs obtained from the attenuation decrement. The dip angle is 60 degrees. Although the resistivity values are consistent in the resistive thin beds, the logs are noisy and show an unexplained spread above 10,350 feet.

Figure 27:
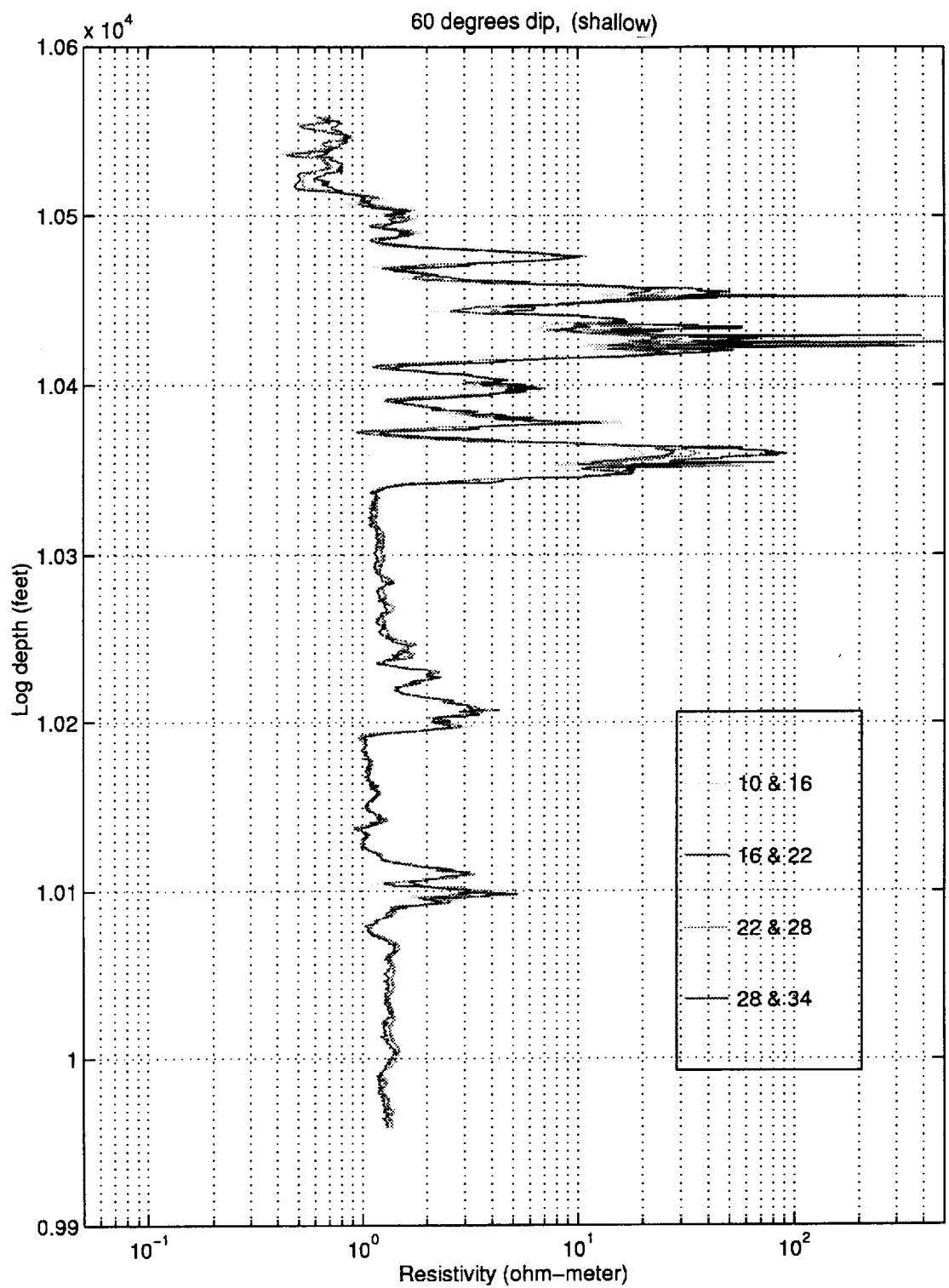
FIG. 27 shows a resistivity log of the field log of FIG. 25 after application of the techniques of the present invention.
Figure 28:
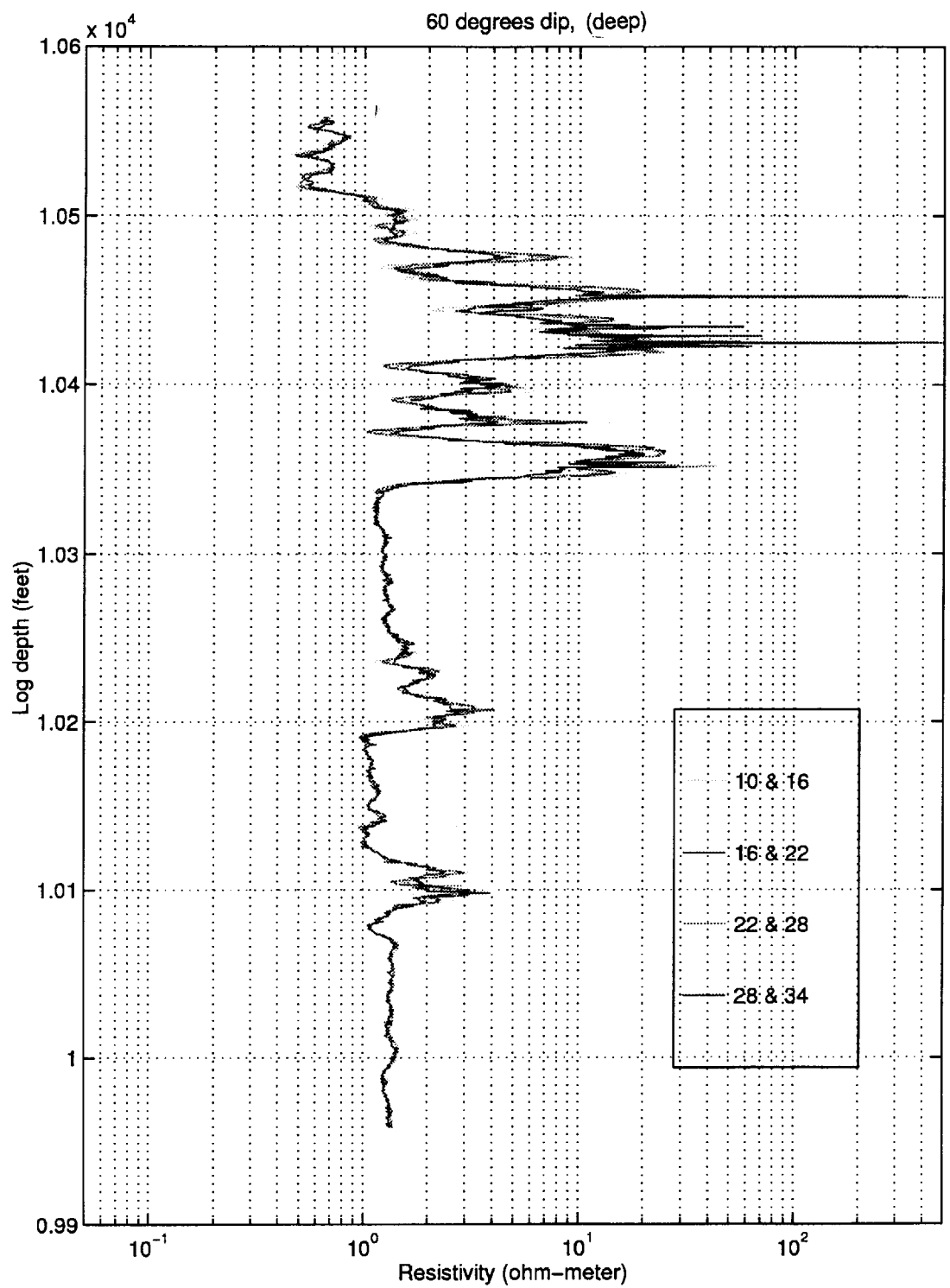
FIG. 28 shows a resistivity log of the field log of FIG. 25 after application of the techniques of the present invention.

FIGS. 27 and 28 show the results obtained with the field log of FIG. 25 after applying the techniques of the present invention. FIG. 27 showing the shallow resistivity inversion and FIG. 28 the deep inversion. Minimizing equation (63) with different weights w1 also produced the profiles of FIGS. 27 and 28. The vertical resolution is essentially the same as with conventional processing. However, with application of the disclosed techniques, a more consistent description of the formation is obtained; the noise, horns and spikes are greatly reduced. The curves of FIGS. 23, 24, 27 and 28 correspond to measurements obtained using the transmitter/receiver combinations (labeled a, b, c, d) of FIG. 12.

While the methods and apparatus of this invention have been described as specific embodiments, it will be apparent to those skilled in the art that variations may be applied to the structures and in the steps or in the sequence of steps of the methods described herein without departing from the concept and scope of the invention. All such similar variations apparent to those skilled in the art are deemed to be within this concept and scope of the invention as defined by the appended claims.

What is claimed is:

1. A method for evaluating the resistivity of earth formations surrounding a borehole, comprising:

a) positioning a pair of transmitters T1, T2 within the borehole;

b) positioning a pair of receivers R1, R2, separated from one another by a distance d, within the borehole;

c) transmitting electromagnetic energy of frequency f1 from a first transmitter of the transmitter pair;

d) receiving voltage data associated with the transmitted energy at the receiver pair;

e) shutting off the transmission of electromagnetic energy from the first transmitter;

f) transmitting electromagnetic energy of frequency f1 from a second transmitter of the transmitter pair;

g) receiving voltage data associated with the transmitted energy at the receiver pair; and h) calculating the following expression to determine the formation conductivity:

$$D_G = \frac{1}{d}(V_{21} - V_{12}),$$

where $V_{21}$ is the voltage data received on receiver R2 when transmitter T1 is active; and $V_{12}$ is the voltage data received on receiver R1 when transmitter T2 is active.

2. The method of claim 1, further comprising establishing voltage data values associated with formation conductivity values based on theoretical modeling and referencing the calculated value for $D_G$ within the established data values to determine the formation conductivity.

3. The method of claim 1, further comprising performing a least squares minimization technique using the calculated value for $D_G$ and values of $D_G$ based on theoretical modeling to determine the formation conductivity.

4. The method of claim 1, wherein the transmitter pair and the receiver pair are disposed on a well tool, the tool having a longitudinal axis and being movable through the borehole.

5. The method of claim 4, wherein the method is performed during or after drilling of the borehole.

6. The method of claim 4, wherein both transmitters of the transmitter pair or both receivers of the receiver pair are disposed along the well tool such that their axes are tilted from the longitudinal axis of the well tool.

7. The method of claim 4, wherein both transmitters of the transmitter pair and both receivers of the receiver pair are disposed along the well tool such that their magnetic moments are tilted from the longitudinal axis of the well tool and the magnetic moments of the receiver pair are in a different direction from the magnetic moments of the transmitter pair.

8. The method of claim 4, wherein both transmitters of the transmitter pair or both receivers of the receiver pair comprise triaxial coils.

9. The method of claim 4, wherein both transmitters of the transmitter pair and both receivers of the receiver pair comprise triaxial coils.

10. The method of claim 4, wherein both transmitters of the transmitter pair or both receivers of the receiver pair are disposed along the well tool such that their axes extend transversely with respect to the longitudinal axis of the well tool.

11. The method of claim 1, further comprising:
i) positioning a second pair of transmitters T3, T4 within the borehole;
j) positioning a second pair of receivers R3, R4, separated from one another by the distance d and wound such that a mutually balanced condition is achieved, within the borehole;
k) repeating steps (c) through (g) utilizing the second receiver and transmitter pairs; and
l) calculating the following expression to determine the formation conductivity:

$$D_G = \frac{1}{d}\frac{N_1}{N_1+N_3}(V_{22}-V_{11}) + \frac{1}{d}\frac{N_3}{N_1+N_3}(V_{44}-V_{33}),$$

where
$N_n$ is the number of respective receiver turns;
$V_{22}$ is the voltage data received on receiver R2 when transmitter T2 is active;
$V_{11}$ is the voltage data received on receiver R1 when transmitter T1 is active;
$V_{44}$ is the voltage data received on receiver R4 when transmitter T4 is active; and
$V_{33}$ is the voltage data received on receiver R3 when transmitter T3 is active.

12. The method of claim 11, further comprising establishing voltage data values associated with formation conductivity values based on theoretical modeling and referencing the calculated value for $D_G$ within the established data values to determine the formation conductivity.

13. The method of claim 11, further comprising performing a least squares minimization technique using the calculated value for $D_G$ and values of $D_G$ based on theoretical modeling to determine the formation conductivity.

14. A method for evaluating the resistivity of earth formations surrounding a borehole, comprising:
a) positioning a pair of receivers R1, R2 and a pair of transmitters T1, T2 within the borehole, either both receivers of the receiver pair or both transmitters of the transmitter pair being separated from one another by a distance d;
b) transmitting electromagnetic energy of frequency f1 from a first transmitter of the transmitter pair;
c) receiving voltage data associated with the transmitted energy at the receiver pair;
d) shutting off the transmission of electromagnetic energy from the first transmitter;
e) transmitting electromagnetic energy of frequency f1 from a second transmitter of the transmitter pair;
f) receiving voltage data associated with the transmitted energy at the receiver pair; and
g) calculating the following expression to determine the formation conductivity:

$$D_G = \frac{1}{2d}(V_{21} - V_{11} + V_{12} - V_{22}),$$

where
$V_{11}$ is the voltage data received on receiver R1 when transmitter T1 is active;
$V_{21}$ is the voltage data received on receiver R2 when transmitter T1 is active;
$V_{12}$ is the voltage data received on receiver R1 when transmitter T2 is active; and
$V_{22}$ is the voltage data received on receiver IC when transmitter T2 is active.

15. The method of claim 14, further comprising establishing voltage data values associated with formation conductivity values based on theoretical modeling and referencing the calculated value for $D_G$ within the established data values to determine the formation conductivity.

16. The method of claim 14, further comprising performing a least squares minimization technique using the calculated value for $D_G$ and values of $D_G$ based on theoretical modeling to determine the formation conductivity.

17. The method of claim 14, wherein the transmitter pair and the receiver pair are disposed on a well tool, the tool having a longitudinal axis and being movable through the borehole.

18. The method of claim 17, wherein the method is performed during or after drilling of the borehole.

19. The method of claim 17, wherein both transmitters of the transmitter pair or both receivers of the receiver pair are disposed along the well tool such that their axes are tilted from the longitudinal axis of the well tool.

20. The method of claim 17, wherein both transmitters of the transmitter pair and both receivers of the receiver pair are disposed along the well tool such that their magnetic moments are tilted from the longitudinal axis of the well tool and the magnetic moments of the receiver pair are in a different direction from the magnetic moments of the transmitter pair.

21. The method of claim 17, wherein both transmitters of the transmitter pair or both receivers of the receiver pair comprise triaxial coils.

22. The method of claim 17, wherein both transmitters of the transmitter pair and both receivers of the receiver pair comprise triaxial coils.

23. The method of claim 17, wherein both transmitters of the transmitter pair or both receivers of the receiver pair are disposed along the well tool such that their axes extend transversely with respect to the longitudinal axis of the well tool.

24. The method of claim 17, further comprising:
h) moving the well tool in the borehole;
i) repeating steps (b) through (f); and
j) calculating the following expression to determine the formation conductivity:

$$D_G = \frac{1}{2d}(V_{21} - V_{11} + V_{1'2'} - V_{2'2'}),$$

where
$V_{11}$ is the voltage data received on receiver R1 when transmitter T1 is active and prior to tool movement;
$V_{21}$ is the voltage data received on receiver R2 when transmitter T1 is active and prior to tool movement;
$V_{1'2'}$ is the voltage data received on receiver R1 when transmitter T2 is active and after tool movement; and
$V_{2'2'}$ is the voltage data received on receiver R2 when transmitter T2 is active and after tool movement.

25. The method of claim 24, further comprising establishing voltage data values is associated with formation conductivity values based on theoretical modeling and referencing the calculated value for $D_G$ within the established data values to determine the formation conductivity.

26. The method of claim 24, further comprising performing a least squares minimization technique using the calculated value for $D_G$ and values of $D_G$ based on theoretical modeling to determine the formation conductivity.

27. A well logging system including a well tool adapted to be moveable through a borehole and an apparatus adapted to be coupled to the well tool, the well tool having a longitudinal axis and including at least one pair of transmitters T1, T2 and at least one pair of receivers R1, R2 disposed along the longitudinal axis, where the transmitters emit energy of at least one specific frequency and the receivers develop voltage data associated with the emitted energy, at least one pair of receivers R1, R2 being separated from one another by a distance d, the apparatus being adapted to respond to the voltage data for determining a formation conductivity profile and for recording the profile on an output record medium, the apparatus comprising:

means for inputting the voltage data;
means for calculating the following expression to determine a formation conductivity profile:

$$D_G = \frac{1}{d}(V_{21} - V_{12}),$$

where
$V_{21}$ is the voltage data received on receiver R2 when transmitter T1 is active;
$V_{12}$ is the voltage data received on receiver R1 when transmitter T2 is active; and
means for recording the conductivity profile on an output record medium.

28. The system of claim 27, the calculating means further comprising means for establishing voltage data values associated with formation conductivity values based on theoretical modeling and referencing the calculated value for $D_G$ within the established data values to determine the formation conductivity.

29. The system of claim 27, the calculating means further comprising means for performing a least squares minimization technique using the calculated value for DC and values of $D_G$ based on theoretical modeling to determine the formation conductivity.

30. The system of claim 27, wherein both transmitters of at least one transmitter pair or both receivers of at least one receiver pair are disposed along the well tool such that their axes are tilted from the longitudinal axis of the well tool.

31. The system of claim 27, wherein both transmitters of at least one transmitter pair and both receivers of at least one receiver pair are disposed along the well tool such that their magnetic moments are tilted from the longitudinal axis of the well tool and the magnetic moments of the at least one receiver pair are in a different direction from the magnetic moments of the at least one transmitter pair.

32. The system of claim 27, wherein both transmitters of at least one transmitter pair or both receivers of at least one receiver pair comprise triaxial coils.

33. The system of claim 27, wherein both transmitters of at least one transmitter pair and both receivers of at least one receiver pair comprise triaxial coils.

34. The system of claim 27, wherein both transmitters of at least one transmitter pair or both receivers of at least one receiver pair are disposed along the well tool such that their axes extend transversely with respect to the longitudinal axis of the well tool.

35. A program storage de-vice readable by a processor and encoding a program of instructions including instructions for performing the apparatus operations recited in claim 27.

36. The system of claim 27, wherein the well tool includes a second pair of receivers, R3, R4, the receivers R3, R4 being separated form one another by the distance d and wound such that a mutually balanced condition is achieved, and a second pair of transmitters T3, T4, the calculating means further comprising:

means for calculating the following expression to determine the formation conductivity:

$$D_G = \frac{1}{d}\frac{N_1}{N_1 + N_3}(V_{22} - V_{11}) + \frac{1}{d}\frac{N_3}{N_1 + N_3}(V_{44} - V_{33}),$$

where
$N_n$ is the number of respective receiver turns;
$V_{22}$ is the voltage data received on receiver R2 when transmitter 12 is active;
$V_{11}$ is the voltage data received on receiver R1 when transmitter T1 is active;
$V_{44}$ is the voltage data received on receiver R4 when transmitter T4 is active; and
$V_{33}$ is the voltage data received on receiver R3 when transmitter T3 is active.

37. The system of claim 36, the calculating means further comprising means for establishing voltage data values associated with formation conductivity values based on theoretical modeling and referencing the calculated value for $D_G$ within the established data values to determine the formation conductivity.

38. The system of claim 36, the calculating means further comprising means for performing a least squares minimization technique using the calculated value for $D_G$ and values of $D_G$ based on theoretical modeling to determine the formation conductivity.

39. A program storage device readable by a processor and encoding a program of instructions including instructions for performing the apparatus operations recited in claim 36.

40. A well logging system including a well tool adapted to be moveable through a borehole and an apparatus adapted to be coupled to the well tool, the well tool having a longitudinal axis and including at least one pair of transmitters T1, T2 and at least one pair of receivers R1, R2 disposed along the longitudinal axis, where the transmitters emit energy of at least one specific frequency and the receivers develop voltage data associated with the emitted energy, at least one pair of receivers R1, R2 or one pair of transmitters T1, T2 being separated from one another by a distance d, the apparatus being adapted to respond to the voltage data for determining a formation conductivity profile and for recording the profile on an output record medium, the apparatus comprising:

means for inputting the voltage data;
means for calculating the following expression to determine a formation conductivity profile:

$$D_G = \frac{1}{2d}(V_{21} - V_{11} + V_{12} - V_{22}),$$

where
$V_{11}$ is the voltage data received on receiver R1 when transmitter T1 is active;
$V_{21}$ is the voltage data received on receiver R2 when transmitter T1 is active;
$V_{12}$ is the voltage data received on receiver R1 when transmitter T2 is active;
$V_{22}$ is the voltage data received on receiver R2 when transmitter T2 is active; and means for recording the conductivity profile on an output record medium.

41. The system of claim 40, the calculating means further comprising means for establishing voltage data values associated with formation conductivity values based on theoretical modeling and referencing the calculated value for $D_G$ within the established data values to determine the formation conductivity.

42. The system of claim 40, the calculating means further comprising means for performing a least squares minimization technique using the calculated value for $D_G$ and values of $D_G$ based on theoretical modeling to determine the formation conductivity.

43. The system of claim 40, wherein both transmitters of at least one transmitter pair or both receivers of at least one receiver pair are disposed along the well tool such that their axes are tilted from the longitudinal axis of the well tool.

44. The system of claim 40, wherein both transmitters of at least one transmitter pair and both receivers of at least one receiver pair are disposed along the well tool such that their magnetic moments are tilted from the longitudinal axis of the well tool and the magnetic moments of the at least one receiver pair are in a different plane from the magnetic moments of the at least one transmitter pair.

45. The system of claim 40, wherein both transmitters of at least one transmitter pair or both receivers of at least one receiver pair comprise triaxial coils.

46. The system of claim 40, wherein both transmitters of at least one transmitter pair and both receivers of at least one receiver pair comprise triaxial coils.

47. The system of claim 40, wherein both transmitters of at least one transmitter pair or both receivers of at least one receiver pair are disposed along the well tool such that their axes extend transversely with respect to the longitudinal axis of the well tool.

48. A program storage device readable by a processor and encoding a program of instructions including instructions for performing the apparatus operations recited in claim 40.

* * * * *